United States Patent [19]
Kubota et al.

[11] Patent Number: 5,724,317
[45] Date of Patent: Mar. 3, 1998

[54] APPARATUS AND A METHOD FOR INDICATING MEASUREMENTS WITH AN ANALOG DISPLAY AND A POINTER UNIT THEREOF

[75] Inventors: Masaru Kubota; Keiichiro Oguchi; Takashi Kawaguchi; Hidenori Nakamura, all of Suwa, Japan

[73] Assignee: Seiko Epson Corporation, Tokyo, Japan

[21] Appl. No.: 464,027

[22] Filed: Jun. 5, 1995

[30] Foreign Application Priority Data

Jun. 3, 1994 [JP] Japan .................. 6-145598
May 11, 1995 [JP] Japan .................. 7-137214

[51] Int. Cl.$^6$ .................. G04B 4/06; G04L 7/00
[52] U.S. Cl. .................. 368/11; 368/10; 368/80
[58] Field of Search .................. 368/10, 12, 11, 368/80

[56] References Cited

U.S. PATENT DOCUMENTS 3,602,046  8/1971  Lawford .................. 73/299
3,696,610  10/1972 Charbonnier .................. 368/1
4,107,996  8/1978  Hollingsworth et al. .................. 73/300
4,186,690  4/1980  Alinari .
5,251,190  10/1993 Miyasaka et al. .................. 368/10

FOREIGN PATENT DOCUMENTS

058957A1  4/1992  European Pat. Off. .
DE-C-157834  3/1903  Germany .

*Primary Examiner*—Bernard Roskoski
*Attorney, Agent, or Firm*—Stroock & Stroock & Lavan LLP

[57] ABSTRACT

A current measured value measured by sensor is indicated by a measured value pointer. A maximum or minimum value pointer is interlocked with the measured value pointer and moves only in an incremental or decremental direction to indicate the maximum or minimum measured value. Therefore, a current measured value and the maximum or minimum value can be indicated simultaneously by a single drive source.

32 Claims, 20 Drawing Sheets

5,724,317

APPARATUS AND A METHOD FOR INDICATING MEASUREMENTS WITH AN ANALOG DISPLAY AND A POINTER UNIT THEREOF

BACKGROUND OF THE INVENTION

The present invention relates to an apparatus and a method for indicating measurements with an analog display and a pointer unit thereof. Such an apparatus may include depth meter, barometers, altimeters, thermometers and other meters in which the maximum or minimum value can be indicated with a current measured value.

For example, a diver's depth meter is known which has a pointer indicating a current depth of a diver and a maximum value pointer indicating the maximum depth of the diver during the measurement. Such a depth meter comprises a motor for rotatably driving the pointer and another motor for rotatably driving the maximum value pointer. The motor for the maximum value pointer stops when the maximum value pointer is at a position of the maximum depth during the measurement to stop the maximum pointer.

In the conventional analog display measuring instrument which stores and indicates the maximum or minimum measured value and the computed result of the measurements such as an average value, the pointers are respectively driven by drives independent from each other even if the maximum or minimum measured value and the computed result are indicated on the same dial. Before the measurement begins, the conventional analog display measuring instrument can not perform the indication or indicate only zero or a preset minimum value.

In the conventional analog display measuring instrument which indicates a plurality of measured values or a plurality of data computed from these measured values, no sound or only one kind of confirmation sound is produced to notify indication of data.

In the conventional analog display measuring instrument which performs the measurement in a fixed cycle, when the motion of the pointer does not terminate in the cycle, the pointer continues indicating while next measurement is carried out, or the pointer temporarily stops indicating during the measurement. In such a conventional analog display measuring instrument, measuring is forcedly suspended by an operation such as simultaneous pushing of switch buttons.

These analog display measuring instruments such as a depth meter will be more expensive to manufacture since they utilize two different motors for driving the current measured value pointer and maximum value pointer, respectively. If a single drive motor is used to drive both pointers and if the maximum value pointer is made to stay at a position of the maximum value, the number of the motors can be reduced to lower the manufacturing cost. In such a case, however, the maximum value pointer must be subjected to a large load for preventing it from being undesirably displaced from the proper position due to vibration or impact. At this time, the current measured value pointer must also be loaded while being driven. This will increase the power consumption.

The conventional analog display measuring instrument which stores and indicates the maximum or minimum value of the measurements and the computed result of measurements such as an average value needs a number of drive sources because the pointers are driven independently even if the maximum or minimum value and the computed value are indicated on the same dial. However, since the conventional analog display measuring instrument which stores and indicates the current measured value and associated data indicates either nothing, a variable, a zero value, or a minimum measurable value before measuring, one cannot confirm whether or not the indication function can be properly performed, and cannot execute the indication function for learning or explaining the operational manner until the measurement is executed. Since the conventional analog display measuring instrument which indicates the current measured value and the maximum or minimum measured value does not indicate time information simultaneously, an elapsed time since initiation of the measurement cannot be indicated. Additionally, since the conventional analog display measuring instrument which stores and indicates the maximum or minimum measured value and the computed result of measurements such as an average value does not indicate time information simultaneously, an elapsed time since initiation of the measurement cannot be indicated. Further, since the conventional analog display measuring instrument which indicates the current measured value and the maximum or minimum measured value does not indicate time information simultaneously, an initiation time of measurement cannot be indicated. Lastly, since the conventional analog display measuring instruments which stores and indicates the maximum or minimum measured value and the computed result of measurements such as an average value does not indicate time information simultaneously, an initiation time of measurement cannot be indicated.

When it is wanted to provide a maximum value indicating pointer movable only in an incremental direction or a minimum value pointer movable only in a decremental direction in synchronization with motion of the current measured value pointer, if there is no means for automatically returning the current measured value pointer to a home position together with the maximum or minimum value pointer, the pointers have to be returned manually. However, since the conventional analog display measuring instrument which indicates a plurality of measured values or a plurality of data computed from these measured values generates no confirmation sound or only one kind of confirmation sound on calling the data, the user must count the number of operations for data calling to know which data is called.

The conventional analog display measuring instrument which indicates a plurality of measured values or a plurality of data computed from these measured values does not have a function of returning the indication to its normal state through the same means for data calling after all the data of measured values have been called. Therefore, a special operation is required to return the indication to its normal state.

In the conventional analog display measuring instrument which performs the measurement in a fixed cycle, when the motion of the pointer does not terminate in the cycle, the pointer continues indicating while next measurement is carried out, or the pointer temporarily stops indicating during the measurement. This raises various problems in that noises, causing an improper measurement, may be produced when the pointers are driven, in that the capacity of the power source becomes insufficient due to the simultaneous execution of both the drive and measurement and in that the movement of the pointers is delayed relative to the measurement.

Since the conventional analog display measuring instrument which performs the measurement in a fixed cycle may be forcedly suspended from measuring by an operation such as simultaneous pushing of switch buttons, a wrong operation can be undesirably made to stop the measurement.

SUMMARY OF THE INVENTION

An analog display measuring instrument includes a measured value pointer for indicating a current value measured by a measuring sensor. A maximum or minimum value pointer for indicating a maximum or minimum measured value movable only in an incremental or decremental direction is interlocked with the measured value pointer. A gear train coupled to the measured value pointer drives the measured value pointer. A drive source drives the gear train. A control controls the drive source to move the measured value pointer to a position corresponding to a measured value obtained by the measuring sensor.

The analog display measuring instrument indicating a measured value and the maximum or minimum value can drive both the measured value pointer and maximum or minimum value pointer through a single drive source. Thus; the analog display measuring instrument can be simplified in structure and reduced in size and cost. Since the number of drive sources occupying a relatively large volume is reduced, designing can be done more easily and freely.

In an exemplary embodiment the analog display measuring instrument can be in a first or second indication mode and includes an input to select the first and second indication mode. A maximum or minimum value memory stores the maximum or minimum value among values measured by the measuring sensor. An on board computer performs a specific computation relative to a value measured by the measuring sensor such as average value and a computation result memory store the computed result. The control controls the drive source to move the measured value pointer to a position corresponding to a value measured by the measuring sensor when the first indication mode is selected by the input, or to a position corresponding to the maximum or minimum value stored in the maximum or minimum value memory and then to a position corresponding to a computed result stored in the computation result memory when the second indication mode is selected by the input whereby values respectively stored in the maximum or minimum value memory and computation result memory can be simultaneously indicated.

In an analog display measuring instrument which stores and indicates the maximum or minimum measured value, the average value and the computed result of measurement, both the maximum value pointer and measured value pointer can be driven by a single drive source. Thus, the analog display measuring instrument can be simplified in structure and reduced in size and cost. Since the number of drive sources occupying a relatively large volume is reduced, designing can be done more easily and freely.

In another embodiment the analog display measuring instrument includes a timer for measuring an elapsed time.

A time information pointer operatively coupled to the timer indicates time information generated by the timer. A second gear train drives the time period information pointer, and a second drive source drives the second gear train. The control controls the second drive source to move the time information pointer to a position corresponding to a time measured by the timer, whereby a measured value by the measuring sensor can be simultaneously indicated with time information from the timer.

In the analog display measuring instrument for indicating a measured value and the maximum or minimum value therefore, an elapsed time from initiation of the measurement can be indicated. Thus, the user can easily know the time information. The analog display measuring instrument may be more broadly used in various fields.

The analog display measuring instrument may further include a time information memory for storing time information obtained by the timer wherein the control controls the second drive source to move the time information pointer to a position corresponding to a value stored in the time information memory when the second indication mode is selected by the input, whereby the maximum or minimum value stored in the maximum or minimum value memory, a value stored in the computation result storage means, and time information stored in the time information memory can be simultaneously indicated. In the analog display measuring instrument which stores and indicates the maximum or minimum measured value, the average value and the computation result of measured values therefore, the time information can also be stored and indicated. The user can easily know the time information in addition to the maximum or minimum value and computation result. The analog display measuring instrument may be more broadly used in various fields.

The analog display measuring instrument may also include a second timer which measures a present time.

A time pointer indicates a present time measured by the second timer. A third gear train operatively coupled to the second timer pointer drives the time pointer and a third drive source drives the third gear train.

The control controls the third drive source such that a present time measured by the second timer is indicated by the time pointer when the measuring sensor is not in operation, and a time at which the measuring sensor has started measuring is indicated when the measuring means is in operation.

In the analog display measuring instrument which indicates a measured value and the maximum or minimum value therefore, present time information can be also indicated. The user can easily know time information in addition to the maximum or minimum value and computation result. The analog display measuring instrument may be more broadly used in various fields.

The analog display measuring instrument further includes a measurement initiation time memory for storing a time of measurement initiation of the measuring sensor, wherein the control controls the third drive source to move the time pointer to a position corresponding to a time stored in the measurement initiation time memory when the second indication mode is selected by the input means, whereby the maximum or minimum value stored in the maximum or minimum value memory, a value stored in the computation result memory, and a time stored in the measurement initiation time memory can be simultaneously indicated.

In the analog display measuring instrument which stores and indicates the maximum or minimum measured value, the average value and the computation result of measured values therefore, the measurement initiation time can also be indicated. The user can easily know the time information. The analog display measuring instrument may be more broadly used in various fields.

An initializer is provided which causes the maximum or minimum value memory, computation result memory, time information memory and measurement initiation time memory and others to store specific values. As a result, the analog display measuring instrument for indicating the measured values and associated data can execute the normal indication even if the measurement has not still been started. Thus, the user can confirm whether or not the indication function is normally executed even when the measurement is not made. Furthermore, the user can learn or explain the operational manner even if the measurement has not been made. This is particularly effective in the depth meter or other meters in which it is difficult to execute their measuring function in the normal state.

The analog display measuring instrument further includes a home position setting mechanism for returning the measured value and maximum or minimum value pointers to a home position, wherein the control controls the home position setting mechanism to operate the drive source to move the measured value and maximum or minimum value pointers to the home position.

In the analog display measuring instrument which includes the maximum or minimum value pointer movable only in the incremental or decremental direction in synchronization with motion of the measured value pointer, the measured value and maximum or minimum value pointers can be automatically returned to the home position together. Therefore, the operation for returning the maximum or minimum value pointer to the home position can be simplified to improve the operability greatly.

In the analog display measuring instrument, the input selects one of various types of second indication modes to indicate data stored in the maximum or minimum value memory or the computation result memory; and the maximum or minimum value memory or the computation result memory is selected by selecting one of the second indication modes by the input to move the measured value pointer to a position corresponding to a measured value stored in a selected memory. A confirmation sound generator for generating a confirmation sound when one of the second indication modes is selected by the input and a confirmation sound control causes the confirmation sound generator to generate a type of sound corresponding to the second indication mode selected by the input.

In the analog display measuring instrument which indicates a plurality of measured values or a plurality of data computed from the measured values therefore, a type of sound corresponding to the elected data can be generated such that the user can easily confirm what data is selected. Thus, the operation of confirming the selected data can be simplified to improve the operability greatly.

In the analog display measuring instrument, the input selects one of the second indication modes for the maximum or minimum value or computation result memory depending on the number of inputs. The control controls the drive source depending on the number of inputs from the input to move the measured value pointer to a position corresponding to a measured value stored in the selected memory and the control controls the drive source to move the measured value pointer to a position of the measured value when the number of inputs from the input exceeds a set number.

In the analog display measuring instrument which indicates a plurality of measured values or a plurality of data computed from the measured values depending on the number of inputs, the indication can be easily returned to the normal state merely by continuously performing the same operation as in the data selecting operation. Therefore, the operation of returning the indication to the normal state after selecting the desired data can be simplified to improve the operability greatly.

The analog display measuring instrument may also include an operation discriminator and controller for suspending an operation of the measuring sensor until the measured value pointer shows a result of preceding measurement. Thus, the measurement can be prevented from being inaccurately performed due to noises generated when the measured value indicating pointer is being driven while power insufficiency due to movement of the measured value pointer together with next measurement can be also prevented. Moreover, time required to move the measured value pointer can be reduced. A delay of indication, which is a shortcoming in the conventional analog display measuring instruments, can be improved to increase the quality in the analog display measuring instrument.

The analog display measuring instrument may include a crown input interlocked with a crown and an input control means for stopping an operation of the measuring sensor when there is an input from the crown input. The crown is of a screw lock type. Thus, the measurement can be prevented from being interrupted by an unintentional operation.

In the analog display measuring instrument, the measuring sensor measures any one of depth of a diver, atmospheric pressure, temperature and altitude. Thus, the analog display measuring instrument can indicate the measured depths of a diver, atmospheric pressures, temperatures or altitudes with their maximum or minimum value utilizing a single drive source.

The present invention provides a pointer unit in an analog display measuring instrument comprising a measured value pointer for indicating a current measured value and a maximum or minimum value pointer to be placed at the maximum or minimum measurement position for indicating the maximum or minimum value. The measured value pointer is rotatably connected to one drive source, wherein the maximum or minimum value pointer rotates with rotation of the measured value pointer and stops at a position of the maximum or minimum value during measurement. Since the measured value pointer can rotate, accompanied by the maximum or minimum value pointer, by a single drive source, the number of drive sources can be minimized to reduce the manufacturing cost.

The pointer unit may also include a measured value indicating wheel connected to the drive source for rotating the measured value pointer. A maximum or minimum value indicating wheel rotates the maximum or minimum value pointer. A control cam stops the maximum or minimum value indicating wheel at the maximum or minimum measurement position according to rotation of the measured value indicating wheel. A keep plate engages the control cam for stopping the control cam. The measured value indicating wheel includes a driver for driving and stopping the control cam. The maximum or minimum value indicating wheel includes a cam engagement which engages with the control cam in a rotational direction of the maximum or minimum value indicating wheel and enables the control cam to slide in a diametric direction of the maximum or minimum value indicating wheel, and a cam bias for biasing the control cam in the diametric direction. The control cam includes a mesh portion engageable with the keep plate to stop the maximum or minimum value indicating wheel and the keep plate includes another mesh portion formed therein at a position opposite to the mesh portion of the control cam and engageable with the mesh portion of the control cam.

Thus, the control cam can be rotated in association with rotation of the measured value indicating wheel while the measured value indicating wheel can be solely returned to the home position. The engaging portion of the control cam can be engaged with the cam engagement of the maximum or minimum value indicating wheel. Therefore, the rotation of the control cam can be accompanied by the maximum or minimum value indicating wheel. When the measured value indicating wheel is returned to the home position, the maximum or minimum value indicating wheel can remain at its position after movement.

As a result, by a single drive source, the measured value indicating wheel can rotate accompanied by the maximum or minimum value indicating wheel and the maximum or minimum value indicating wheel can stop at its maximum or minimum measurement position in a reliable manner.

In the pointer unit in the analog display measuring instrument, the measured value indicating wheel if formed with annular rotation slit having non-connected ends and functioning to drive and stop the control cam and a groove portion formed therein at at least one end for releasing the control cam from stoppage. The control cam includes a rotary guide pin which is fitted in the rotation slit to engage with the measured value indicating wheel in a given direction, engagement means which rotatably engages with the cam engagement and slides in the diametric direction of the maximum or minimum value indicating wheel and a contact portion brought into contact with the cam bias to receive the biasing force; the mesh portion of the control cam being formed on the outer periphery of the control cam at a position opposite to the contact portion.

Thus, the engaging portion of the control cam which causes the rotary guide pin to engage with the rotation slit and control cam releasing groove portion of the measured value indicating wheel can be engaged with the cam engagement of the maximum or minimum value indicating wheel to be slidable in the diametric direction. The control cam can be biased diametrically and outwardly by the cam bias means to engage or disengage the mesh portion of the control cam with the mesh portion of the keep plate through the groove portion of the measured value indicating wheel. Therefore, the maximum or minimum value indicating wheel can be placed at the maximum or minimum measurement position at all times without application of a rotation load. When the drive source is a motor, less load may be applied to the motor to reduce the power consumption since the cam bias means requires only a small load. Since the maximum or minimum value indicating wheel is positioned by engagement of the control cam with the keep plate, it can be reliably made. Even if a vibration is applied to these components, a shift can be positively prevented.

In the pointer unit in the analog display measuring instrument, the groove portion formed in the rotation slit for releasing the control cam from stoppage has a sloped bias portion for biasing the rotary guide pin of the control cam in the outward direction. When the mesh portion of the keep plate is engaged with the mesh portion of the control cam, it can be reliably accomplished at the maximum or minimum measurement position without rotational deviation in the control cam.

In the pointer unit in the analog display measuring instrument, one of opposed surfaces of the maximum or minimum value indicating wheel and control cam includes a plurality of projections formed therein for preventing close contact of the maximum or minimum value indicating wheel with the control cam. Thus, the control cam can be easily slid relative to the maximum or minimum value indicating wheel in the diametrical direction. As a result, the mesh portion of the control cam can be easily engaged or disengaged with the mesh portion of the keep plate.

In the pointer unit in the analog display measuring instrument, the mesh portion of the keep plate includes a plurality of teeth formed therein and equidistantly spaced away from one another and wherein the mesh portion of the control cam also includes teeth each of which outwardly or inwardly engages with any adjacent two teeth in the mesh portion of the keep plate. Thus, the keep plate can be easily manufactured while securing the engagement corresponding to one pitch increment. This can reduce the manufacturing cost. The indexing and position around the periphery of the control cam can be more finely made by less teeth.

In the pointer unit in the analog display measuring instrument, the groove portion formed in the rotation slit of the measured value indicating wheel for releasing the control cam from stoppage includes a jam preventing surface for preventing a jam produced when the control cam engages with the keep plate. Thus, the control cam can be smoothly engaged with the keep plate. The number of working steps can be reduced to lower the manufacturing cost with improvement of the working accuracy.

According to still another aspect of this invention, a method for indicating measurements with an analog display which performs measuring by a measuring sensor, moves a measured value pointer by a drive source through a gear train to indicate a value measured by the measuring sensor, and moves a maximum or minimum value pointer to indicate the maximum or minimum value measured by the measuring sensor, includes the steps of controlling the drive source through a control to move the measured value pointer to a position corresponding to a value measured by the measuring sensor and interlocking the maximum or minimum value pointer with the measured value pointer such that the maximum or minimum value pointer is moved only in an incremental or decremental direction.

The method for indicating measurements with an analog display further includes the steps of storing the maximum or minimum value among values measured by the measuring sensor in a maximum or minimum value memory, performing a specific computation relative to a value measured by the measuring sensor using a computer and storing a computation result in a computation result memory. The control controls the drive source to move the measured value pointer to a position corresponding to a value measured by the measuring means when a first indication mode is selected by an input which can select a first or second indication mode, or to a position corresponding to the maximum or minimum value stored in the maximum or minimum value memory and then to a position corresponding to a computed result stored in the computation result memory when the second indication mode is selected by the input, whereby values respectively stored in the maximum or minimum value memory and computation result memory can be simultaneously indicated.

The method for indication of measurements with an analog display may further include the steps of measuring an elapsed time by a timer and controlling a second drive source by the control to move a time information pointer to a position corresponding to an elapsed time measured by the timer through a second gear train, whereby a value measured by the measuring sensor can be simultaneously indicated with time information from the timer means.

The method for indicating measurements with an analog display further includes a step of controlling a third drive source by the control for driving a time pointer through a third gear train such that a present time measured by a second timer is indicated when the measuring sensor is not in operation, and a time at which the measuring sensor has started measuring is indicated when the measuring sensor is in operation.

The method for indicating measurements with an analog display further includes the steps of detecting a current position of the measured value pointer by a home position setting mechanism and controlling the home position setting mechanism to move the measured value and maximum or minimum value pointers to the home position by the control.

The method for indicating measurements with an analog display further includes the steps of determining whether or not the drive source is in operation after measurement is initiated; and suspending an operation of the measuring sensor until the measured value pointer shows a result of preceding measurement when the drive source is in operation.

The method for indicating measurements with an analog display further comprises a step of stopping an operation of the measuring sensor by an input control when the input control receives an input from a crown input interlocked with a crown.

It is an object of the invention to provide an improved indicator of measurements utilizing an analog display.

It is another object of the present invention to provide an analog display measuring instrument and its pointer unit which require only a single drive source for driving the measured value pointer and the maximum or minimum value pointer to reduce the manufacturing cost, and also to provide an analog measuring instrument and its pointer unit which can prevent an undesirable displacement of the maximum or minimum value pointer due to vibration, impact or the like without addition of any great load thereon.

Yet another object of the present invention is to reduce the number of necessary drive sources by performing the indication of the maximum or minimum value through a maximum value pointer movable only in an incremental direction or a minimum value pointer movable only in a decremental direction in synchronization with motion of a measured value pointer.

Still another object is to provide an analog display measuring instrument which can execute the normal indication even if the measurement has not been performed.

A further object is to provide an analog display measuring instrument which can indicate a measured value and the maximum or minimum value and also show an elapsed time from initiation of the measurement through a time information pointer.

A still further object is to provide an analog display measuring instrument which can indicate the maximum or minimum value of measured values, the average value and the computed result of measurement and also show an elapsed time from initiation of the measurement through a time information pointer.

A further object is to provide an analog display measuring instrument which can indicate a measured value and the maximum or minimum value and also show a time when the measurement is initiated through a time pointer.

A further object is to provide an analog display measuring instrument which can indicate the maximum or minimum value of measured values, the average value and the computed result of measurement and also show a time when the measurement is initiated through a time pointer.

A further object is to provide an analog display measuring instrument which can easily return a maximum or minimum value pointer to its home position.

A further object is to provide an analog display measuring instrument which generates a confirmation sound corresponding to data requested by a user for indicating the type of the data by the type or the number of occurrences of the sound.

A further object is to provide an analog display measuring instrument which can simply return the indication to its normal state merely by continuing the same operation as in the calling of data.

A further object is to provide an analog display measuring instrument which can suspend the measurement to prevent it from being inaccurately executed, due to noises produced when the pointers are driven, until the pointer shows a measured value and which can maintain the capacity of a power source sufficient during the simultaneous execution of pointer drive and measurement with less delay in the indication by the pointer.

A further object is to provide an analog display measuring instrument which forcedly stops the measurement by operating switches interlocked with a crown to prevent mistaken interruption of the measurement.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompany, drawings, in which.

DETAILED DESCRIPTION OF THE PREFERRED EMBODIMENTS

Various preferred embodiments of the present invention will now be described with reference to the drawings.

FIGS. 1 to 10 show one embodiment of a dive watch depth meter to which a pointer unit of an analog display measuring instrument of the present invention is applied. However, the invention is applicable to other measurable phenomena such as barometric pressure, temperature or the like.

Figure 1:
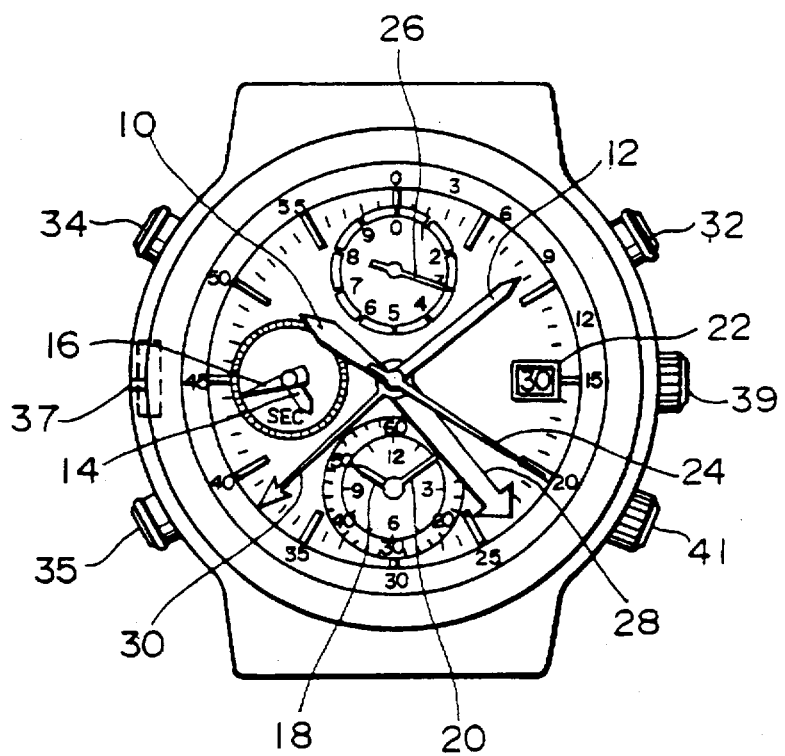
FIG. 1 is a top plan view of a dive watch which uses a pointer unit according to a first embodiment of the present invention.

As shown in FIG. 1, the dive watch of this embodiment can function as a conventional watch which comprises hour and minute hands 10, 12 centrally disposed thereon to display time and a 24-hour hand 14, a small second hand 16, an alarm hour hand 18, an alarm minute hand 20 and a date indicator 22, these components being disposed around the face of the watch.

The watch also includes a diving time pointer 24 which is centrally disposed on the watch and functions as a time information pointer. The watch further includes a one-tenth meter pointer 26, a depth pointer 28 functioning as a current measured value pointer and a maximum depth pointer 30 functioning as a maximum value pointer, these pointers forming a depth meter. The one-tenth meter pointer 26 makes one revolution for every one meter of depth transcended by the user. Each time when the one-tenth meter pointer 26 makes one revolution, the depth pointer 28 rotates one minute to indicate the current measured value. The maximum depth pointer 30 rotates with rotation of the depth pointer 28 and stops at a position corresponding to the maximum value recorded during the measurement.

Thus, the information of diving including the diving time, current depth and maximum depth can be provided by the diving time pointer 24, depth pointer 28, one-tenth meter pointer 26 and maximum depth pointer 30. The alarm hour and minute hands 18, 20 form a time indicator which can indicate a diving start time and warn against a high-speed surfacing. Buttons 32, 34 and 35 for controlling operation of the watch are disposed about the watch. Button 34 is interlocked with a push switch B (PSW-B) 915 shown in FIG. 12. A water sensing switch 27 is disposed in the watch, screw lock type crowns 39 and 41 are disposed about the watch. These switch and crowns functioning in the well-known manner.

Figure 2:
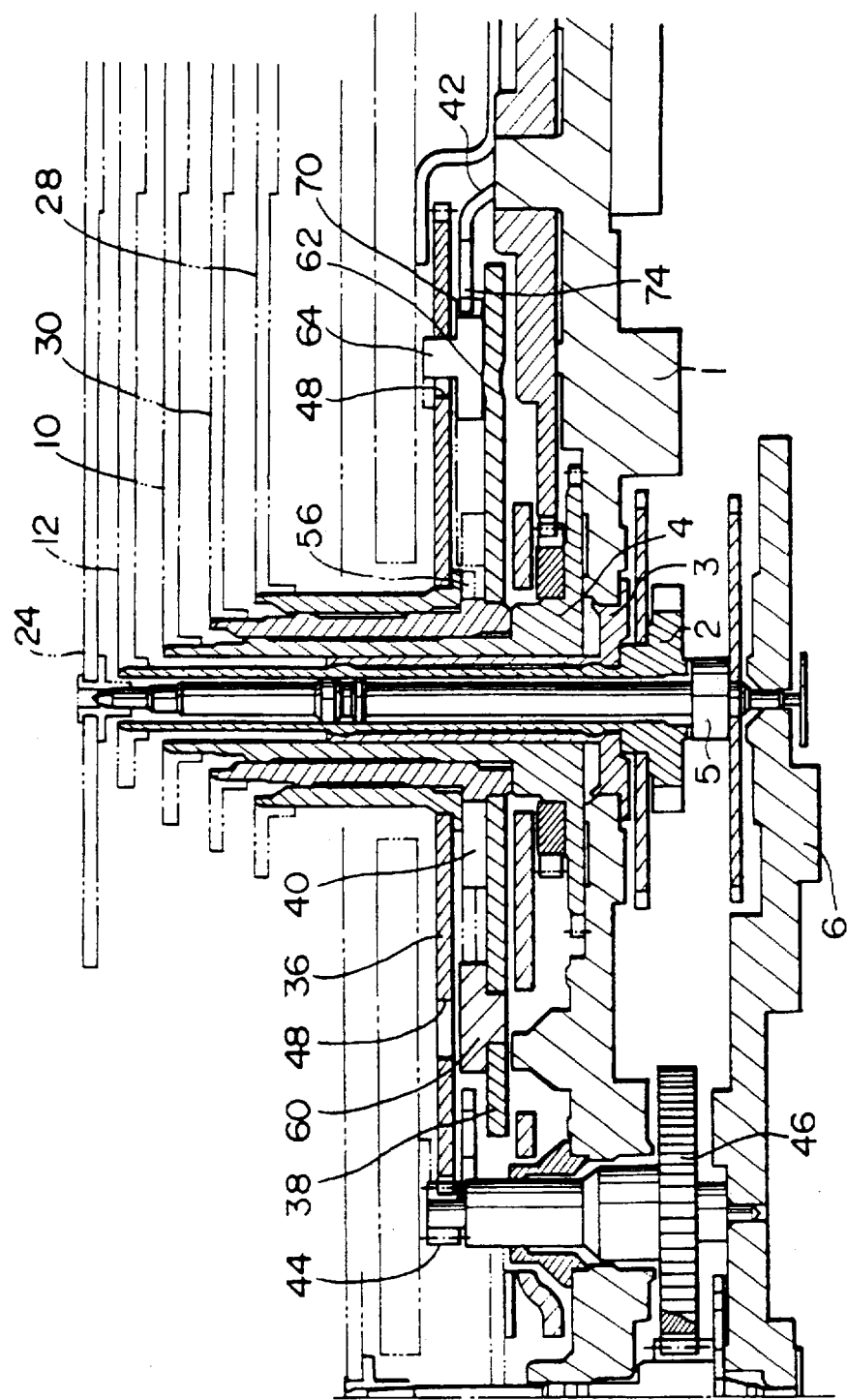
FIG. 2 is a partial enlarged cross-sectional view of FIG. 1.

Reference is now particularly made to FIG. 2, a ground plate 1 is shown as a base plate for holding various components in the watch. A shaft 11 is mounted within ground plate 1. A center wheel 2 to which the minute hand is attached is rotatably mounted about shaft 11. A center pipe 3 is fixedly mounted on the ground plate 1 and adapted to guide the second wheel 2. An hour wheel 4 to which the hour hand is attached is mounted about shaft 11. A dive time indicating wheel 5 to which the diving time indicating pointer is attached is also mounted about shaft 11, a train wheel bridge 6 supports the wheels and shaft. These components function as known in the art.

A pointer unit comprising the depth and maximum depth pointers 28, 30 that form a depth meter will be described mainly with reference to FIGS. 2 and 3.

The pointer unit comprises a measured value indicating wheel 36 mounted about shaft 11 and connected to the depth pointer 28 a maximum value indicating wheel 38 mounted about shaft 11 and connected to the maximum depth pointer 30, a control cam 40 connecting the measured value indicating wheel 36 with the maximum value indicating wheel 38 to be interlocked with each other, and a keep plate 42 for stopping the control cam 40. Drive gears 46 and 44 forming a gear train are mounted on wheel bridge 6. Gear 44 meshes with measured value indicating wheel 36.

Figure 7:
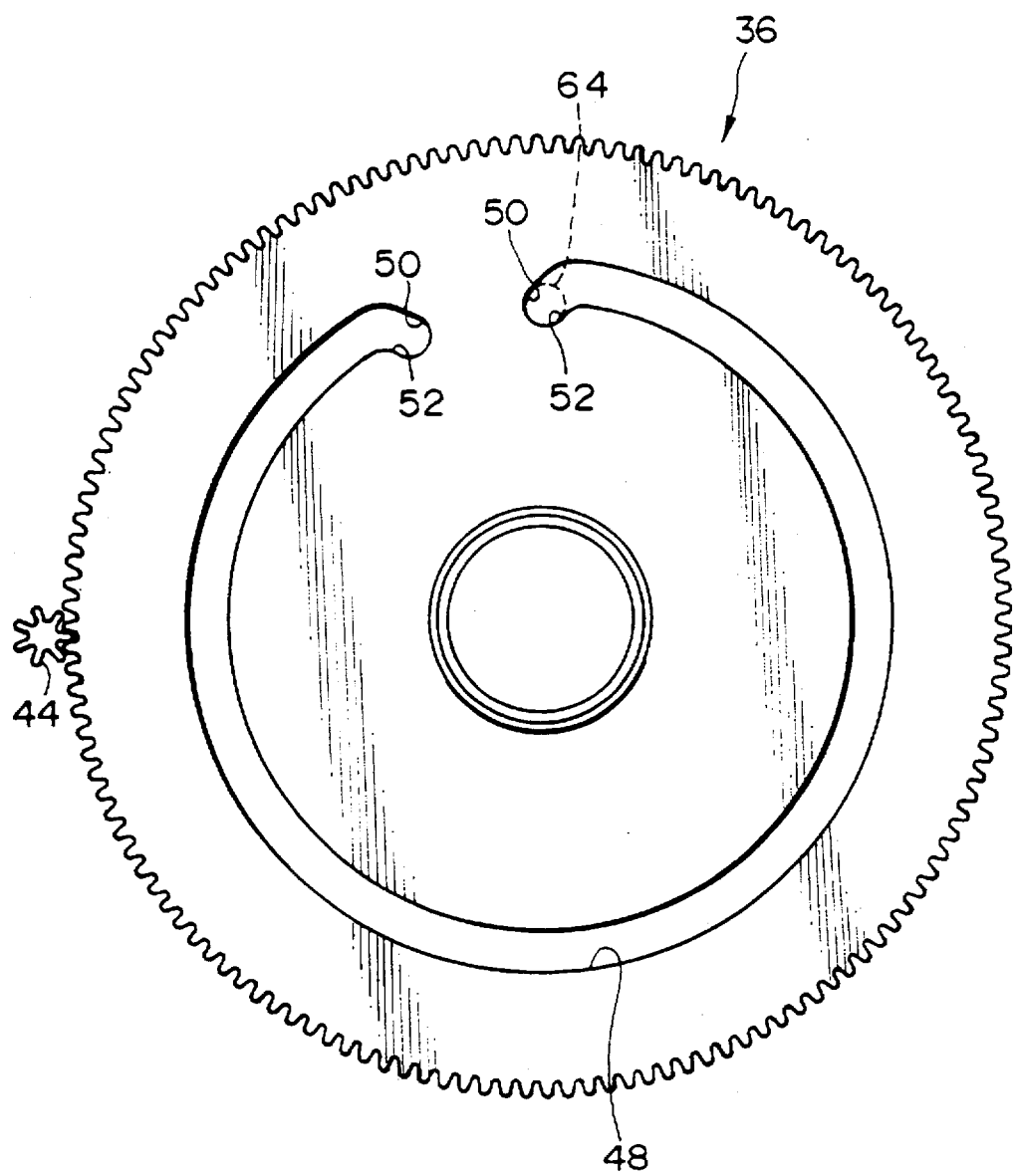
FIG. 7 is a top plan view of a measured value indicating wheel constructed in accordance with the invention.

The measured value indicating wheel 36 is connected to a motor (not shown) functioning as a drive source through gears 44 and 46. The measured value indicating wheel 36 is reversibly rotated by the motor, and the depth pointer 28 is also reversibly rotated through reversible rotation of the measured value indicating wheel 36. As shown in FIG. 7, the measured value indicating wheel 36 includes an annular rotation slit 48 having its opposite non-connected ends and groove portions 50 formed in the rotation slit 48 at the opposite ends thereof for releasing the control cam 40 from stoppage. The rotation slit 48 has a width slightly larger than the diameter of a rotary guide pin 64 (which will be described) formed on the control cam 40. Each of the groove portions 50 extends inwardly substantially toward the center of the measured value indicating wheel 36 and has an inner side that forms a sloped bias portion 52 for outwardly biasing the rotary guide pin 64 of the control cam 40.

Figure 8:
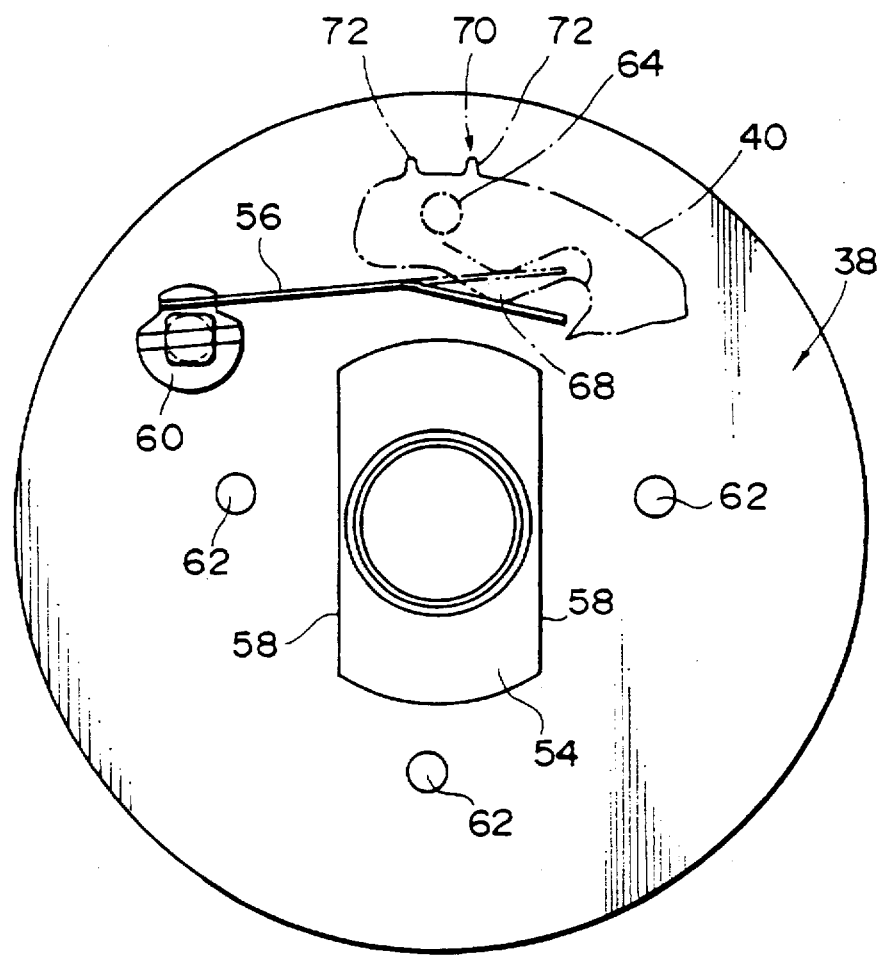
FIG. 8 is a top plan view of a maximum value indicating wheel constructed in accordance with the invention.

The maximum value indicating wheel 38 is disposed about shaft 11 below the measured value indicating wheel 36 and is independently rotatable on the same axis as that of the measured value indicating wheel 36. The rotation of the maximum value indicating wheel 38 rotates the maximum depth pointer 30. As shown in FIG. 8, the maximum value indicating wheel 38 includes a cam engagement 54 formed to protrude from the top and central face thereof and adapted to engage the control cam 40. A leaf spring 56 mounted on a support block 60 on the top of the wheel 38 adjacent the outer periphery thereof functions as cam bias for outwardly biasing the control cam 40 in the diametric direction. The cam engagement 54 has flat slide sides 58 formed therein parallel to each other. The leaf spring 56 has one end attached to the maximum value indicating wheel 38 through a support block 60. When the support block 60 is adjusted in angle, the biasing force of the leaf spring 56 to the control cam 40 can be adjusted. The top face of the maximum value indicating wheel 38 includes a plurality of projections (three in this embodiment) 62 for preventing the maximum value indicating wheel 38 from being brought into intimate contact with the control cam 40.

Figure 9:
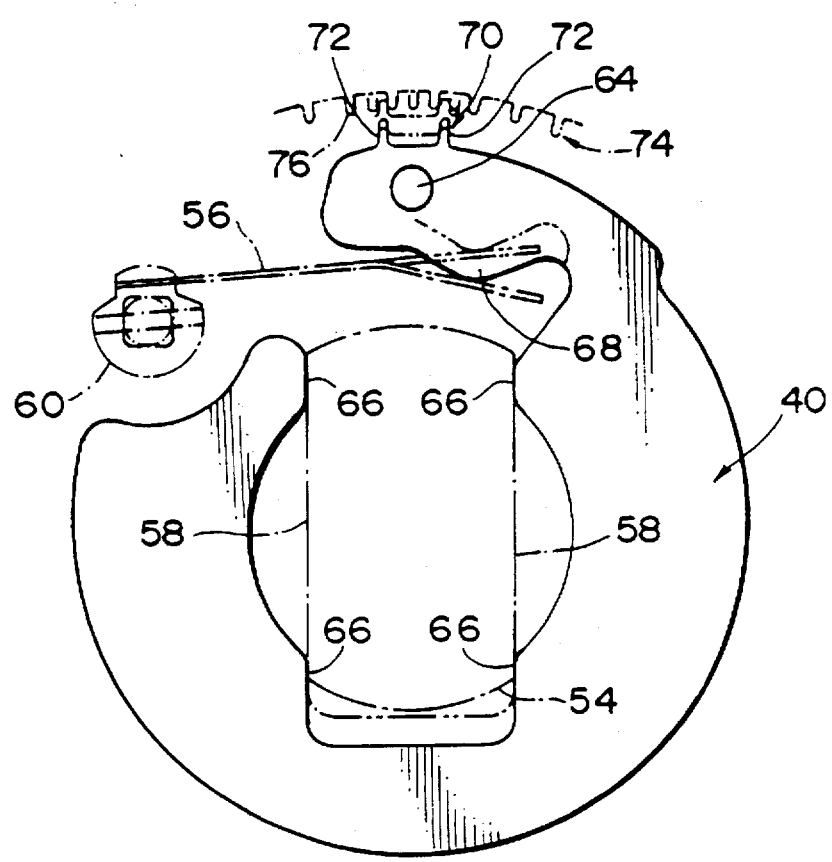
FIG. 9 is a plan view of a control cam constructed in accordance with the invention.

The control cam 40 is disposed between the measured value indicating wheel 36 and the maximum value indicating wheel 38 and adapted to rotatably drive the maximum value indicating wheel 38 in the incremental direction through rotation of the measured value indicating wheel 36. The control cam 40 is further adapted to position the maximum value indicating wheel 38 at the maximum measurement position. As shown In FIG. 9, the control cam 40 is in the form of an annular plate which has opposite non-connected ends. A rotary guide pin 64 functioning as control cam driving/positioning structure is formed at one end of cam 40. Cam 40 is formed with opposed engagements 66, a contact portion 68 and a mesh portion 70.

The rotary guide pin 64 is formed on the top face of the control cam 40 adjacent one end at a position opposite to the rotation slit 48 of the measured value indicating wheel 36. When the rotary guide pin 64 is inserted into the rotation slit 48 of the measured value indicating wheel 36 and engages into the groove portion 50 at the end of the rotation slit 48, the control cam 40 will be rotated as the measured value indicating wheel 36 is rotated in the incremental direction.

The engagements 66 engage the slide sides 58 of the cam engagement 54 of the maximum value indicating wheel 38 at four points such that the control cam 40 can be rotatably driven with the maximum value indicating wheel 38 as a unit and can slide on the slide sides 58 in the diametric direction.

The contact portion 68 is formed on the inner end of the control cam 40 adjacent the rotary guide pin 64 and adapted to contact the free end of the leaf spring 56 on the maximum value indicating wheel 38 such that the control cam 40 is diametrically outwardly biased along the slide sides 58 of the cam engagement 54 under the influence of the leaf spring 56.

The mesh portion 70 is formed on the outer periphery of the control cam 40 at a position opposite to the contact portion 68 and adapted to position the control cam 40 at any rotational position. Thus, the maximum value indicating wheel 38 can be positioned in the same rotational direction as the control cam 40. In this embodiment, the mesh portion 70 includes a pair of teeth 72 extending outwardly and spaced away from each other. The teeth 72 mesh with a keep plate 42.

Figure 10:
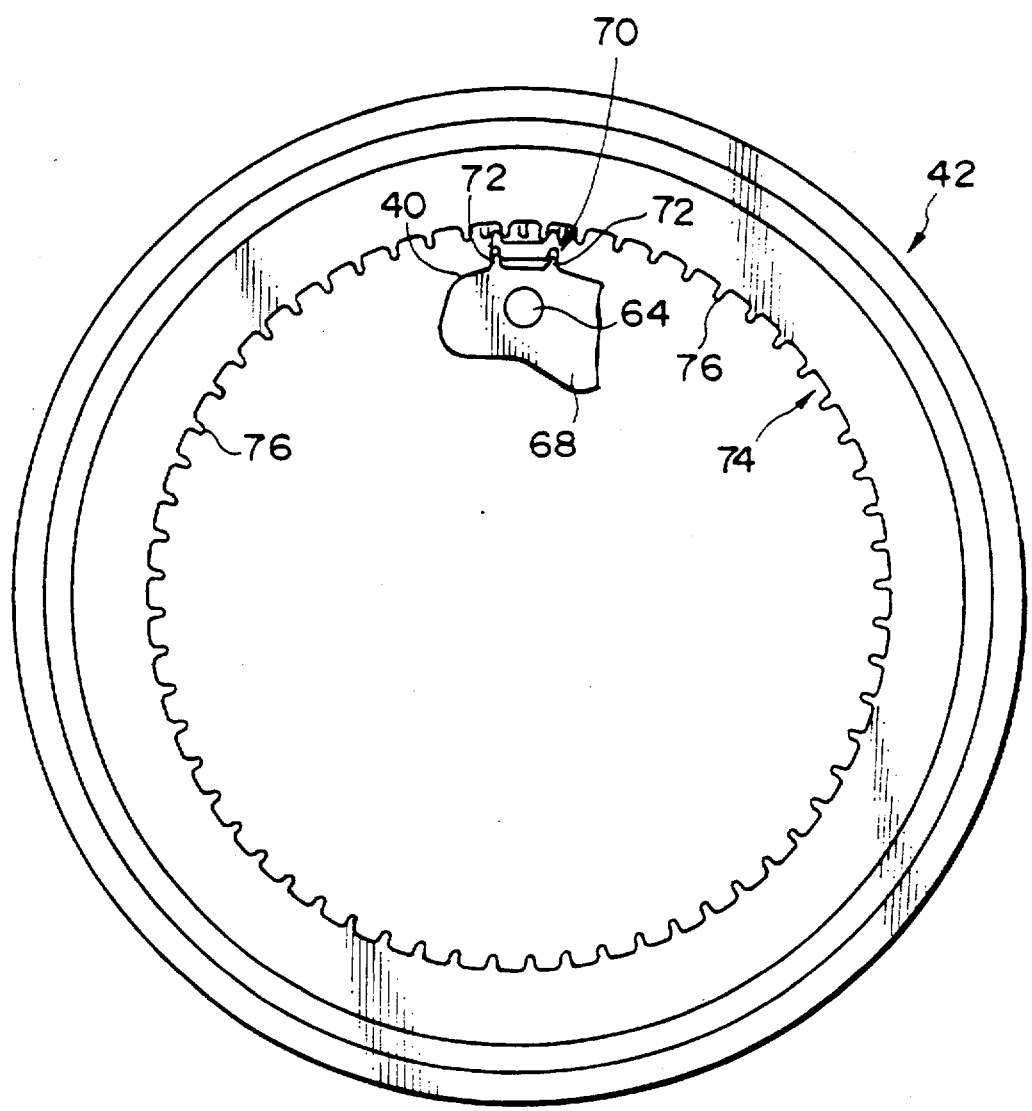
FIG. 10 is a top plan view of a keep plate constructed in accordance with the invention.

The keep plate 42 is in the form of an annular plate which is disposed at a position corresponding to the mesh portion 70 of the control cam 40 and includes an inner periphery having a mesh portion 74 adapted to engage the mesh portion 70 of the control cam 40, as shown in FIG. 10 and maintain cam 40 in position. The mesh portion 74 of the keep plate 40 includes teeth 76 formed therein. In an exemplary embodiment there are eighty teeth 76 spaced to correspond to every one pitch. The pair of teeth 72 on the mesh portion 70 of the control cam 40 outwardly engage two adjacent teeth 76 on the mesh portion 74 of the keep plate 42 and also inwardly engage two outside teeth 76 of three adjacent teeth 76. Thus, the teeth 76 spaced to correspond to every one pitch can be engaged by the teeth 72 of the control cam 40 for every one pitch. By spacing the teeth 76 of the keep plate 42 for every one pitch, the keep plate 42 can be easily manufactured to reduce the manufacturing cost. At the same time, the maximum value indicating wheel 38 can be positioned at any one of one hundred and twenty indexed positions around the periphery of the keep plate 42 even if only sixty teeth are used in the keep plate 42.

The operation of the depth pointer 28 indicator will be described mainly with reference to FIGS. 3 to 6.

Figure 3:
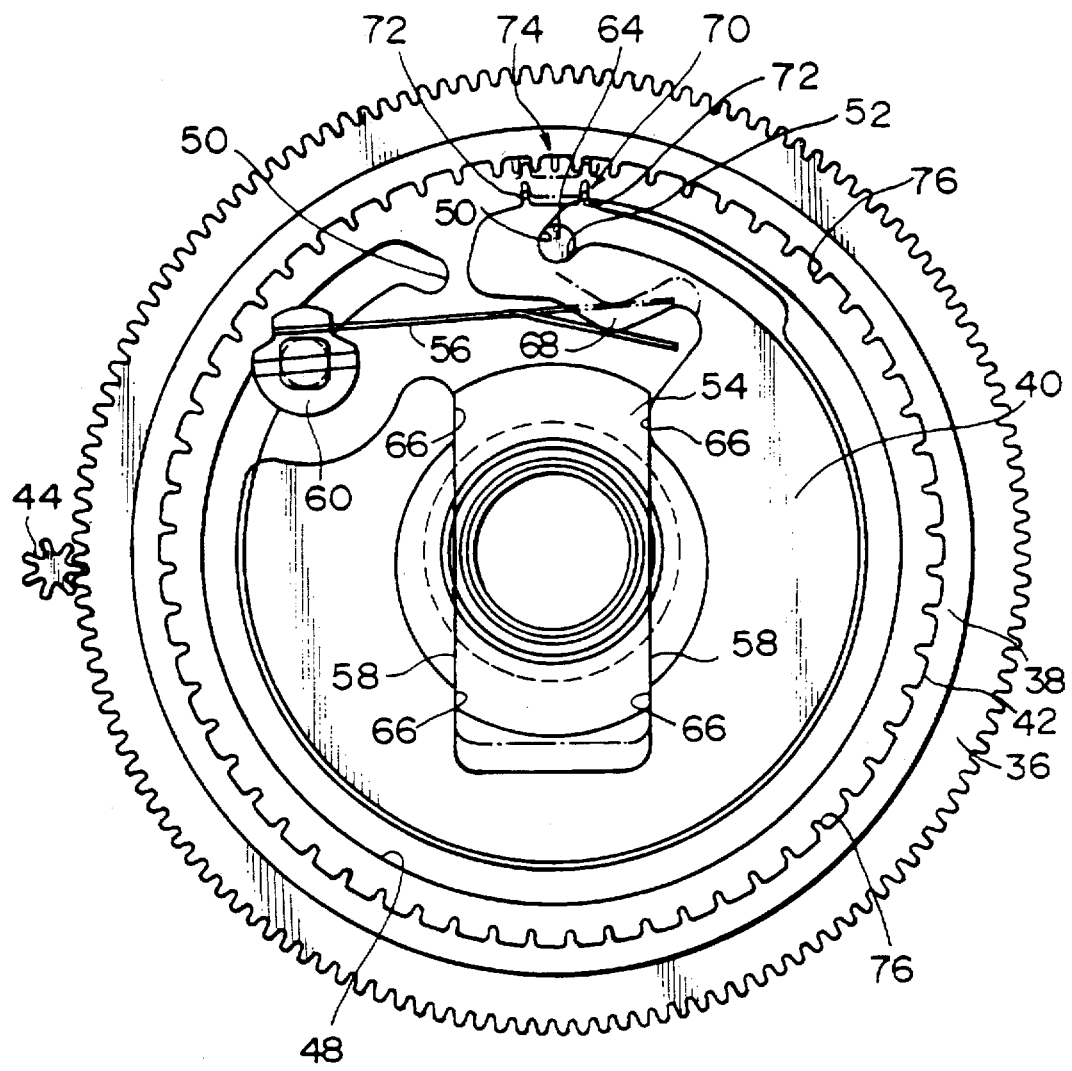
FIG. 3 is a top plan view showing a pointer unit constructed in accordance with the first embodiment of the invention in its start position.

In the start state as shown in FIG. 3, the rotary guide pin 64 of the control cam 40 engages into the groove portion 50 on the end of the rotation slit 48 in the measured value indicating wheel 36. The control cam 40 has been moved relative to the maximum value indicating wheel 38 against the biasing force of the leaf spring 56 such that cam 40 carrying the mesh portion 70 has been slid diametrically and inwardly along the slide sides 58 of the cam engagement 54 in the maximum value indicating wheel 38. Therefore, the mesh portion 70 of the control cam 40 does not engage with the mesh portion 74 of the keep plate 42. The control cam 40 is rotatable with the maximum value indicating wheel 38.

When the diving is initiated at the state of FIG. 3, a rotational force is transmitted from the gears 46 and 44 shown in FIG. 2 to the measured value indicating wheel 36 which is in turn initiated to rotate from the state of FIG. 3, e.g. clockwise. Thus, the rotary guide pin 64 engages into the groove portion 50 of the measured value indicating wheel 36. Since the mesh portion 70 of the control cam 40 does not engage the mesh portion 74 of the keep plate 42, the control cam 40 is rotatably driven in the clockwise direction through the rotation of the measured value indicating wheel 36. The maximum value indicating wheel 38, which can be rotated with the control cam 40 as a unit through the interaction between cam engagement 54 and engagements 66, will also be rotated. As the diving is performed to a given depth, for example, such a state shown in FIG. 4 can be accomplished.

Figure 4:
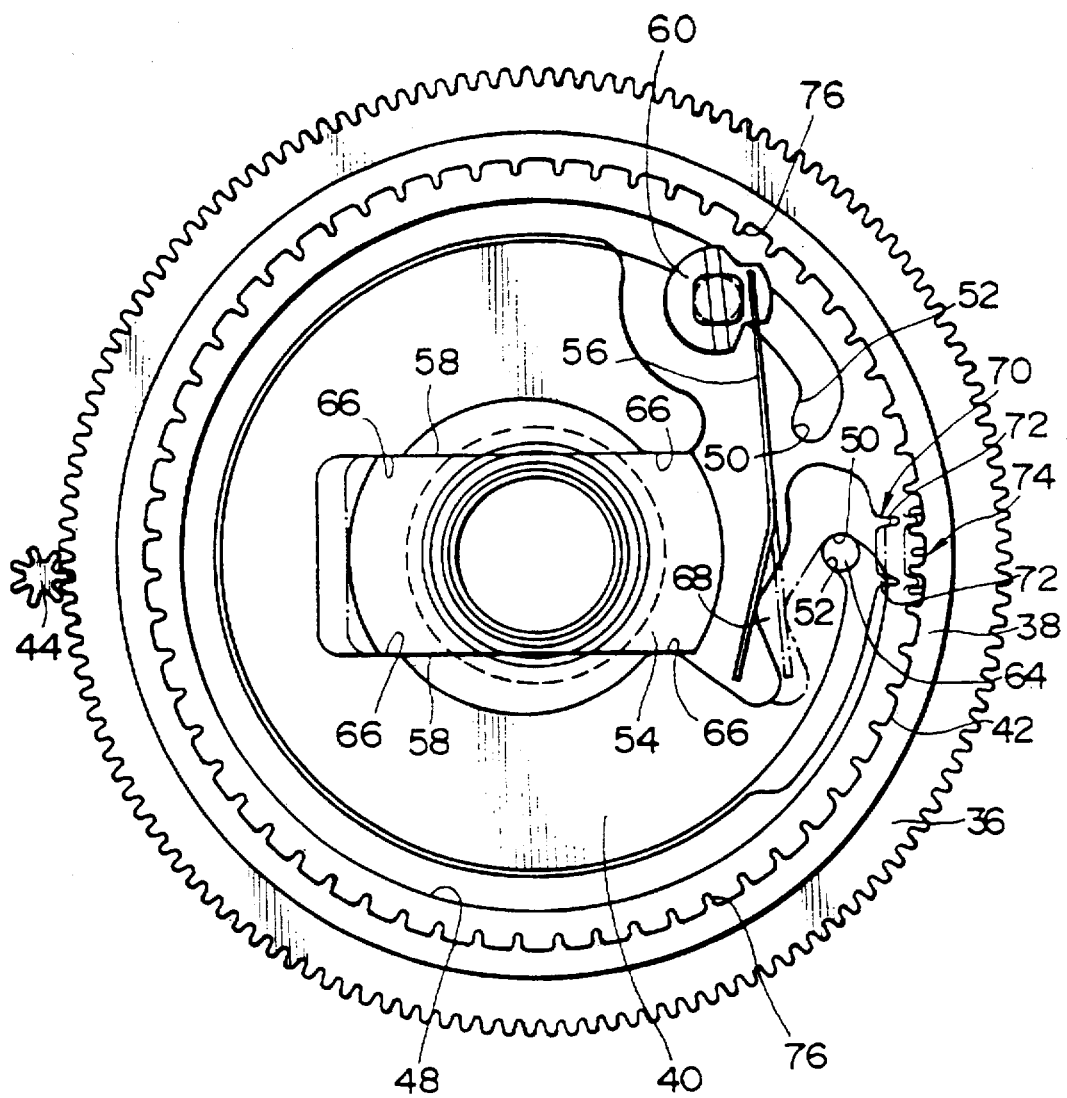
FIG. 4 is a top plan view showing the pointer unit of FIG. 3 when the diver dives in the water.

As the diver begins to surface from the depth position shown in FIG. 4, the sensed depth decreased so that the rotation of the gears 46 and 44 shown in FIG. 2 is reversed to rotate the measured value indicating wheel 36 in the counter-clockwise direction. This permits the rotary guide pin 64 of the control cam 40 engaged into the groove portion 50 of the measured value indicating wheel 36 to be biased diametrically outwardly in cooperation of the sloped bias portion 52 with the biasing force of the leaf spring 56. Thus, the engagements 66 of the control cam 40 are slid along the slide sides 58 formed on the cam engagement 54 of the maximum value indicating wheel 38 to move the control cam 40 on the maximum value indicating wheel 38. The mesh portion 70 of the control cam 40 engages the mesh portion 74 of the keep plate 42 to position the control cam 40.

Therefore, the maximum value indicating wheel 38 rotated with the control cam 40 as a unit is also positioned. Such a positioning can be easily performed since the control cam 40 is diametrically outwardly biased under the action of the leaf spring 56 in the maximum value indicating wheel 38. In addition, the positioning can be accurately made under the action of the sloped bias portion 52 without deviation. Since the control cam 40 is prevented from being brought into intimate contact with the maximum value indicating wheel 38 by the projections 62 in the maximum value indicating wheel 38, the sliding will be positively performed. As the diver has surfaced from this state to some depth, the rotary guide pin 64 of the control cam 40 is moved into the rotation slit 48 of the measured value indicating wheel 36. Therefore, the measured value indicating wheel 36 will only be rotated counter-clockwise while leaving the control cam 40 and maximum value indicating wheel 38 as they are.

Figure 5:
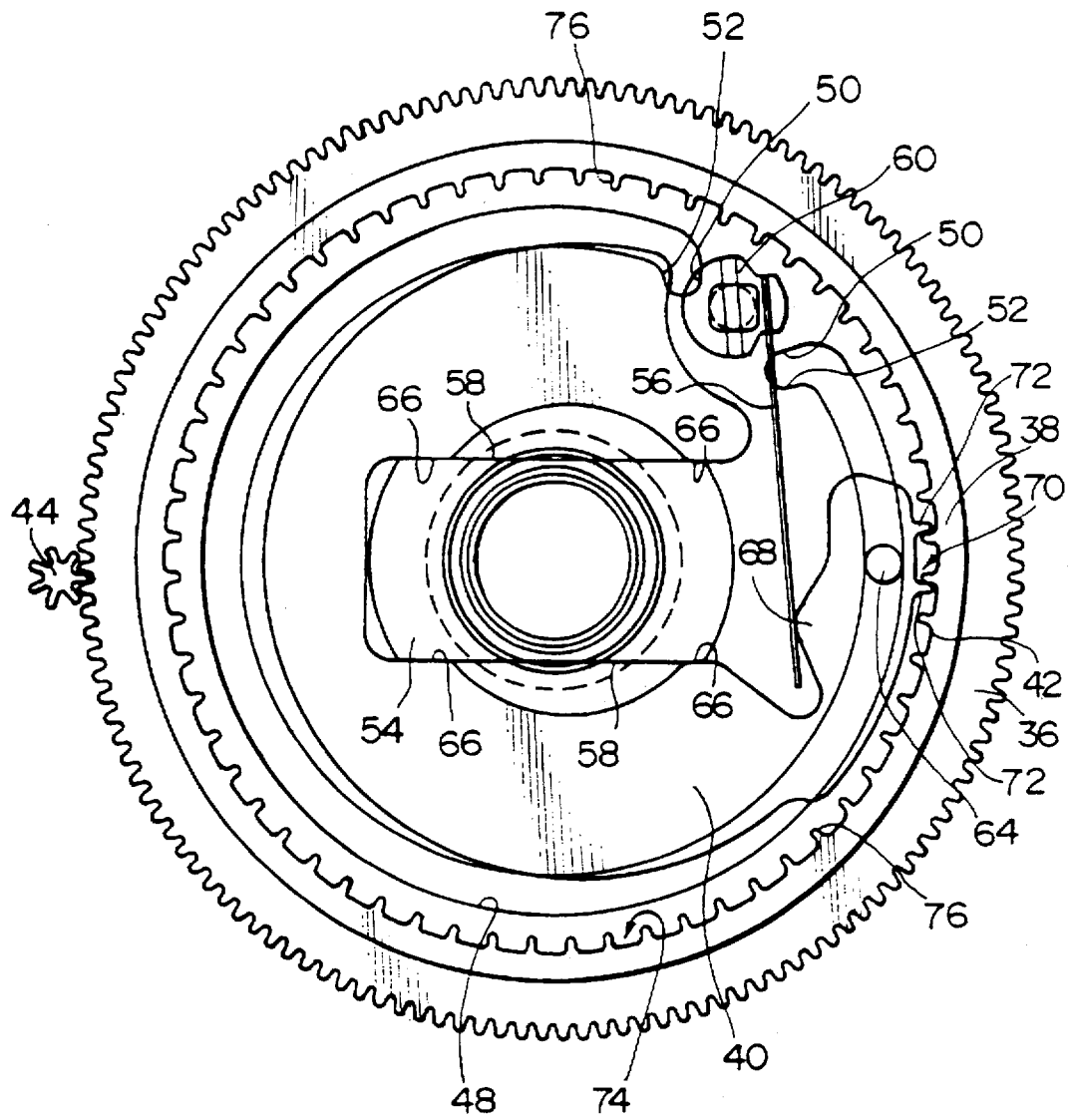
FIG. 5 is a top plan view showing the pointer unit when the diver moves to a reduced depth from the position of FIG. 4.

As the diver moves from the state of FIG. 5 to a depth greater than the maximum depth presently indicated by the rotary guide pin 64, the measured value indicating wheel 36 is initiated to rotate clockwise to engage the rotary guide pin 64 of the control cam 40 into the groove portion 50 of the measured value indicating wheel 36. Thus, the mesh portion 70 of the control cam 40 is disengaged from the mesh portion 74 of the keep plate 42. As a result, the control cam 40 and maximum value indicating wheel 38 are rotated to the depth. As the diver begins to surface from the depth, the control cam 40 is engaged by the keep plate 42 at that position to position the control cam 40 and maximum value indicating wheel 38. Thus, only the measured value indicating wheel 36 is initiated to rotate counter-clockwise while indicating the maximum measured value.

Figure 6:
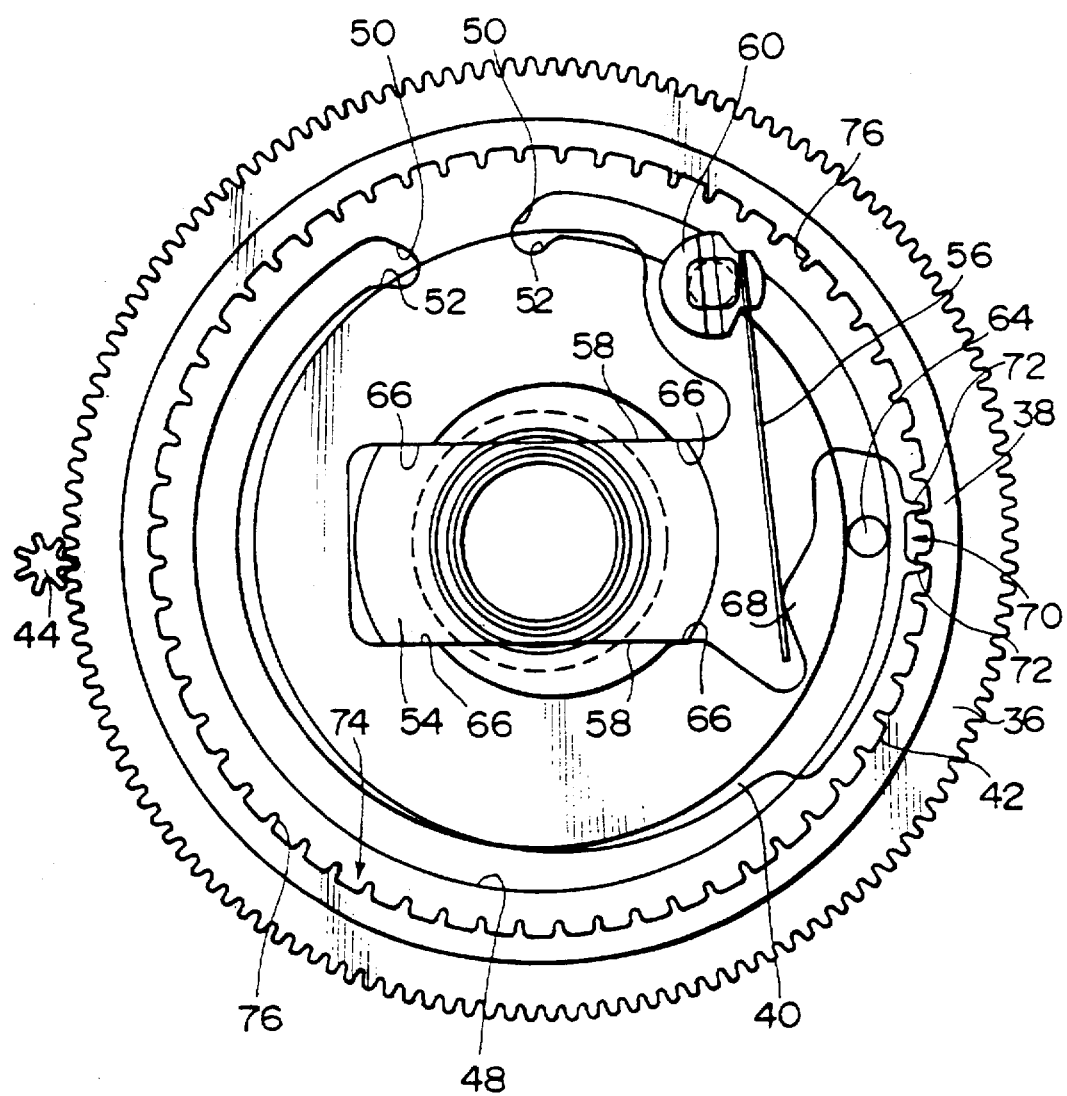
FIG. 6 is a top plan view showing the pointer unit of FIG. 5 when the diver surfaces.

As the diver completely surfaces from the state of FIG. 5, the measured value indicating wheel 36 is counter-clockwise rotated to zero which means the state of FIG. 6 while leaving the control cam 40 and maximum value indicating wheel 38 at the maximum value indicating position.

Therefore, only a single motor can be used to rotate the measured value indicating wheel 36 and maximum value indicating wheel 38 and also to position the maximum value indicating wheel 38 at a position of the maximum value. The motor can be best used to suppress the manufacturing cost.

The maximum value indicating wheel 38 can be positively positioned by engaging the control cam 40 and keep plate 42 which are rotatably driven as a unit through rotation of the maximum value indicating wheel 38. Any deviation due to vibration, falling or the like can be reliably prevented.

Figure 11:
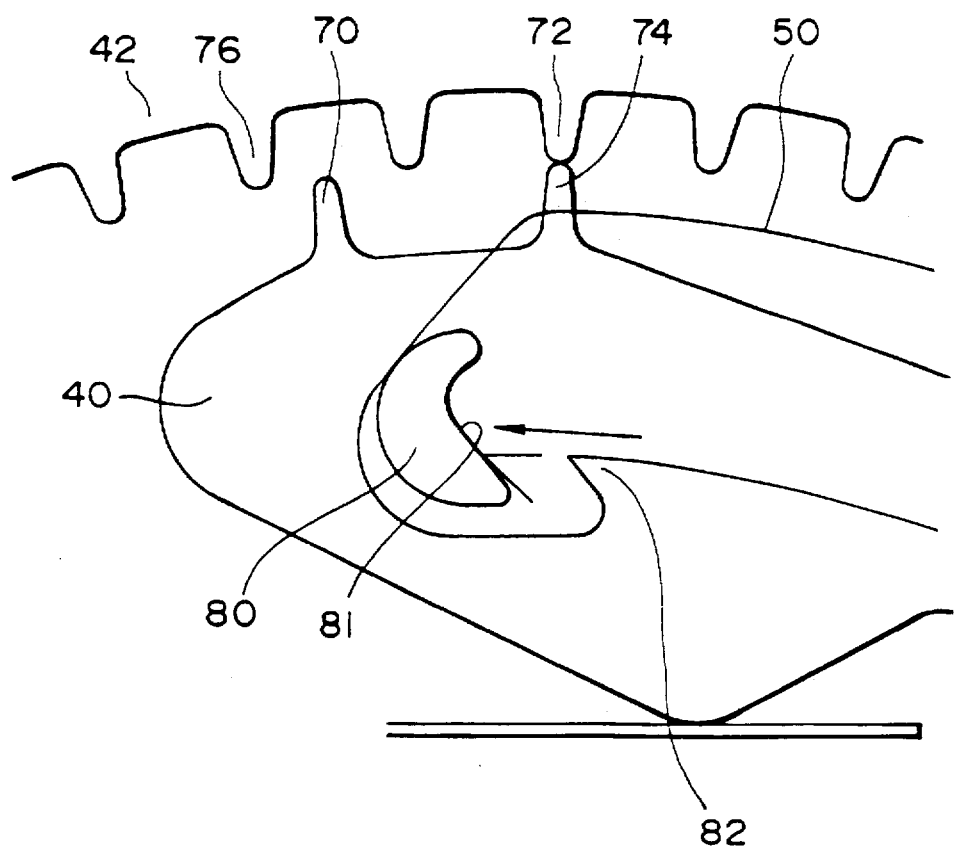
FIG. 11 is an enlarged fragmented top plan view of a keep plate constructed in accordance with a second embodiment of the present invention.

FIG. 11 is a plan view showing another embodiment of a pointer indicator constructed in accordance with the present invention. Like numerals are used to indicate like structures, the primary difference being the information of notch on the guide pin.

A rotary guide pin 80 formed on cam 40 includes a notch 81 formed therein at one side. Each of the groove portions 50 includes a jam preventing portion 82 formed therein at the inner side and, brought into contact with the notch 81. When the maximum value indicating wheel 38 is to be positioned by engaging between the control cam 40 and keep plate 42, the tips of the teeth may jam each other. This can be avoided as follows. When the rotation of the measured value indicating wheel 36 begins to be reversed, the jam preventing portion 82 contacts into the notch 81 in the rotary, guide pin 80 to release the jam. The other structure and function will not be further described since they are similar to those of the previous embodiment.

Figure 13:
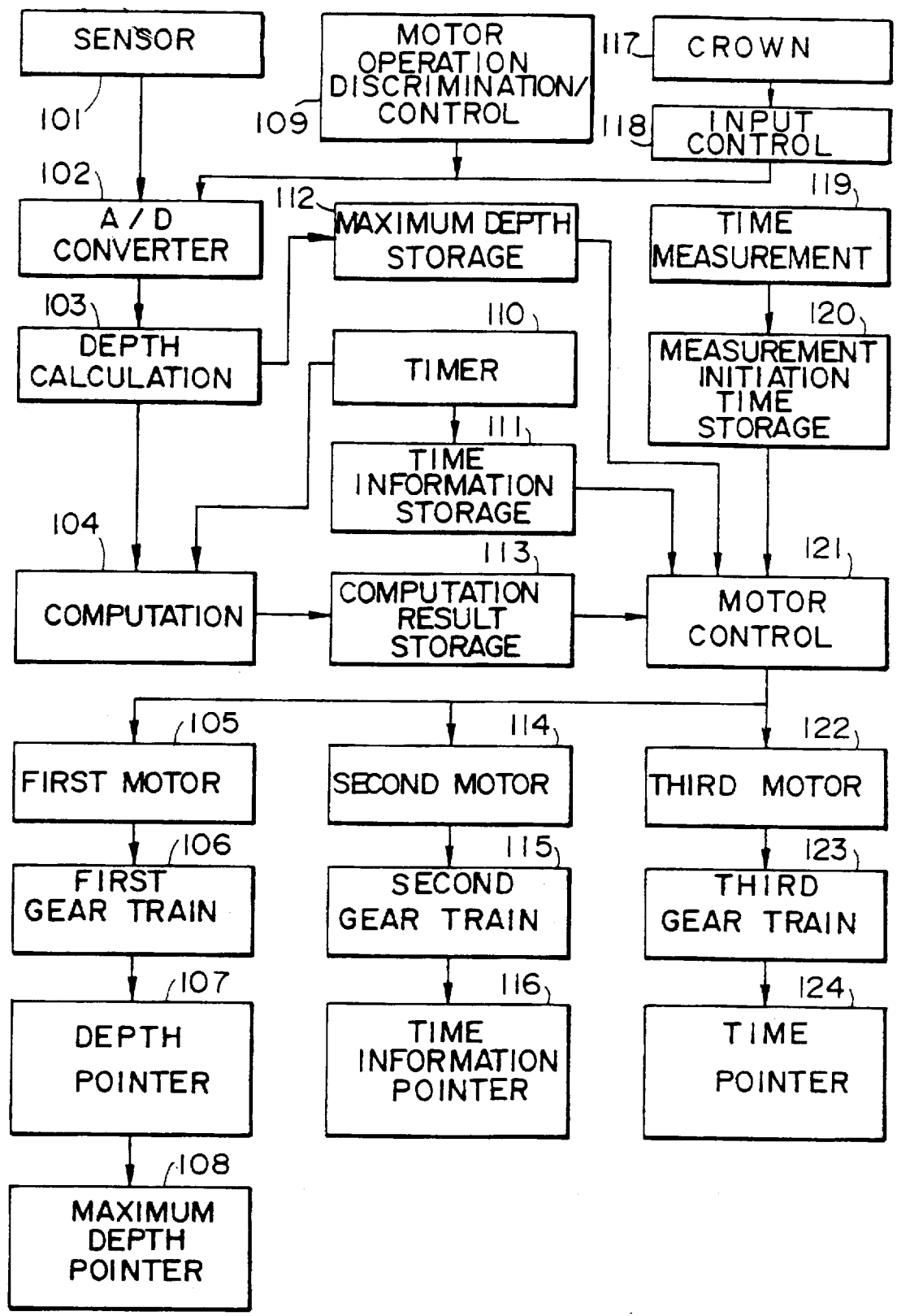
FIG. 13 is a more detailed block diagram of the analog display measuring instrument shown in FIG. 12 with a memory.

The measuring system and indication method of an analog display measuring instrument according to the present invention will be described in detail. FIG. 13 is a block diagram of one embodiment of an analog display measuring instrument with memory constructed in accordance with the present invention.

A sensor 101 is connected to depth calculator 103 through an A/D converter 102. A motor operation discrimination/control 109 is also operatively coupled to depth calculator 103 through A/D converter 102. A crown switch 117 provides an input to an input control 118 which is also coupled to depth calculator 103 through A/D converter 102. Depth calculator 103 provides a signal to motor control 121 through a maximum depth storage (memory) 112. Motor control 121 also receives a control signal from a time measurement 119 through measurement initiation time storage (memory) 120. A timer 110 provides a signal to motor control 121 through time information storage 111. A computer 104 receives inputs from time 110 and depth calculator 103 and provides a signal to motor control 121 through a computation result storage (memory) 113.

Motor control 121 provides control signals to a first motor 105, a second motor 114 and a third motor 122. First motor 105 is operatively coupled to a first gear train 106 which is coupled to depth pointer 107 which in turn is coupled to a maximum depth pointer 108 in a manner described above in connection with depth pointer 28 and maximum depth pointer 30. Second motor 114 drives a second gear train 115 which controls a time information pointer 116. Third motor 122 drives third gear train 123 which controls time pointer 124.

The depth calculator 103 computes a depth measurement corresponding to the output of the A/D converter 102. The maximum depth measurement is stored in maximum depth memory 112 at all times. First motor 105 functioning as a drive source is controlled by motor control 121 for causing a depth pointer 107 to indicate the current depth measurement through a first gear train 106 and for causing a maximum depth pointer 108 to indicate the maximum depth.

Computer 104 computes an average depth from the depth computed by the depth calculator 103 and the time measured by timer 110. The average depth is then stored in computation result memory 113 and coupled with the motor control 121.

The timer 110 measures a diving time period which is in turn stored in time information memory 111 at all times. A second motor 114 functioning as a second drive source is controlled by the motor control 121 for causing a time information pointer 116 to indicate the diving time through a second gear train 115.

Time measurement 119 senses a measurement initiation time at which the measurement of depth is initiated and which is in turn stored in measurement initiation time memory 120. A third motor 122 functioning as a third drive source is controlled by the motor control means 121 for causing a time pointer 124 to indicate the measurement initiation time through a third gear train 123.

Motor operation discrimination/control 109 determines whether or not the motor is in operation and whether or not the measurement of depth should be carried out and controls the A/D converter 102.

Input control 118 determines whether or not the measurement of depth should be carried out depending on the state of a crown 117 and controls the A/D converter 102.

Figure 12:
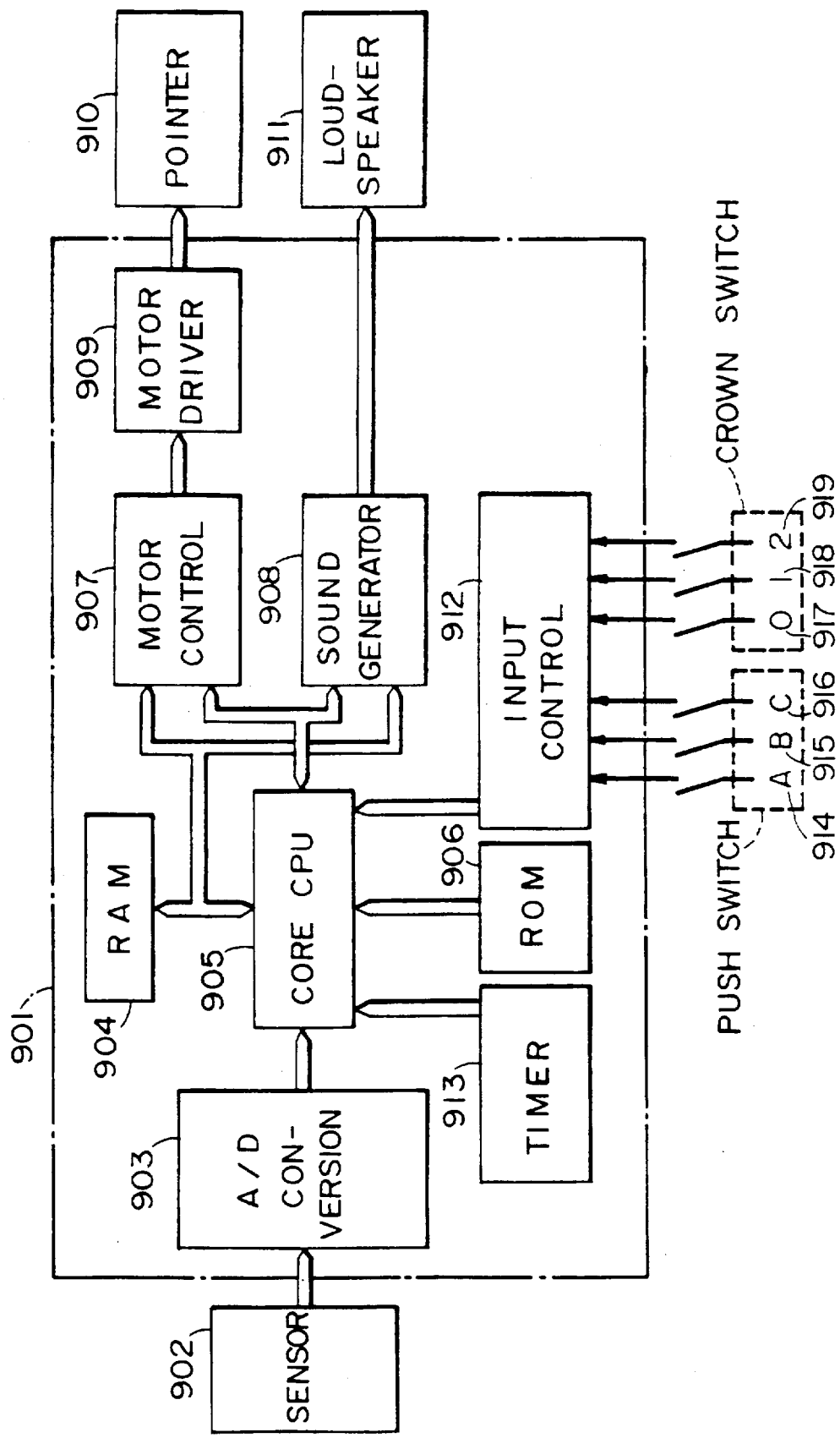
FIG. 12 is a block diagram of the analog display measuring instrument constructed in accordance with each embodiment of the present invention.

FIG. 12 is a hardware diagram showing one embodiment of the analog display measuring instrument with memory shown in FIG. 13.

A microcomputer 901 comprises an A/D converting circuit 903 which receives an input from sensor 902, a RAM 904. A CORE CPU 905 receives an input from A/D converting circuit 903. CORE CPU 905 is coupled to a ROM 906, a RAM 904 a timer 913 for controlling one Hz interruption, a motor control circuit 907 for controlling drive states of motor pulses or the others, a sound generator 908 for generating alarm sounds and an input control circuit 912 for controlling a motor driver 909 and external signals, all of which are connected together through buses. Motor control 907 provides inputs to motor driver 909 which drives a pointer 910. Sound generator 908 controls a load speaker 911.

The microcomputer 901 is also connected to inputs which are formed by a push switch A (PSW-A) 914, a push switch B (PSW-B) 915, a push switch C (Psw-C) 916, a zero-stage crown switch (RMO) 917, a first-stage crown switch (RM1) 918 and a second-stage crown switch (RM2) 919. The sensor 902 is connected to the A/D conversion circuit 903. The pointer 910 is connected to the motor driver 909. The loudspeaker 911 is connected to the sound generator 908. The push switch A (PSW-A) 914, push switch a (PSW-B) 915, push switch C (PSW-C) 916, zero-stage crown switch (RMO) 917, first-stage crown switch (RM1) 918 and second-stage crown switch (RM2) 919 are connected to the input control circuit 912 such that the normal and other indication modes can be selected.

Figure 17:
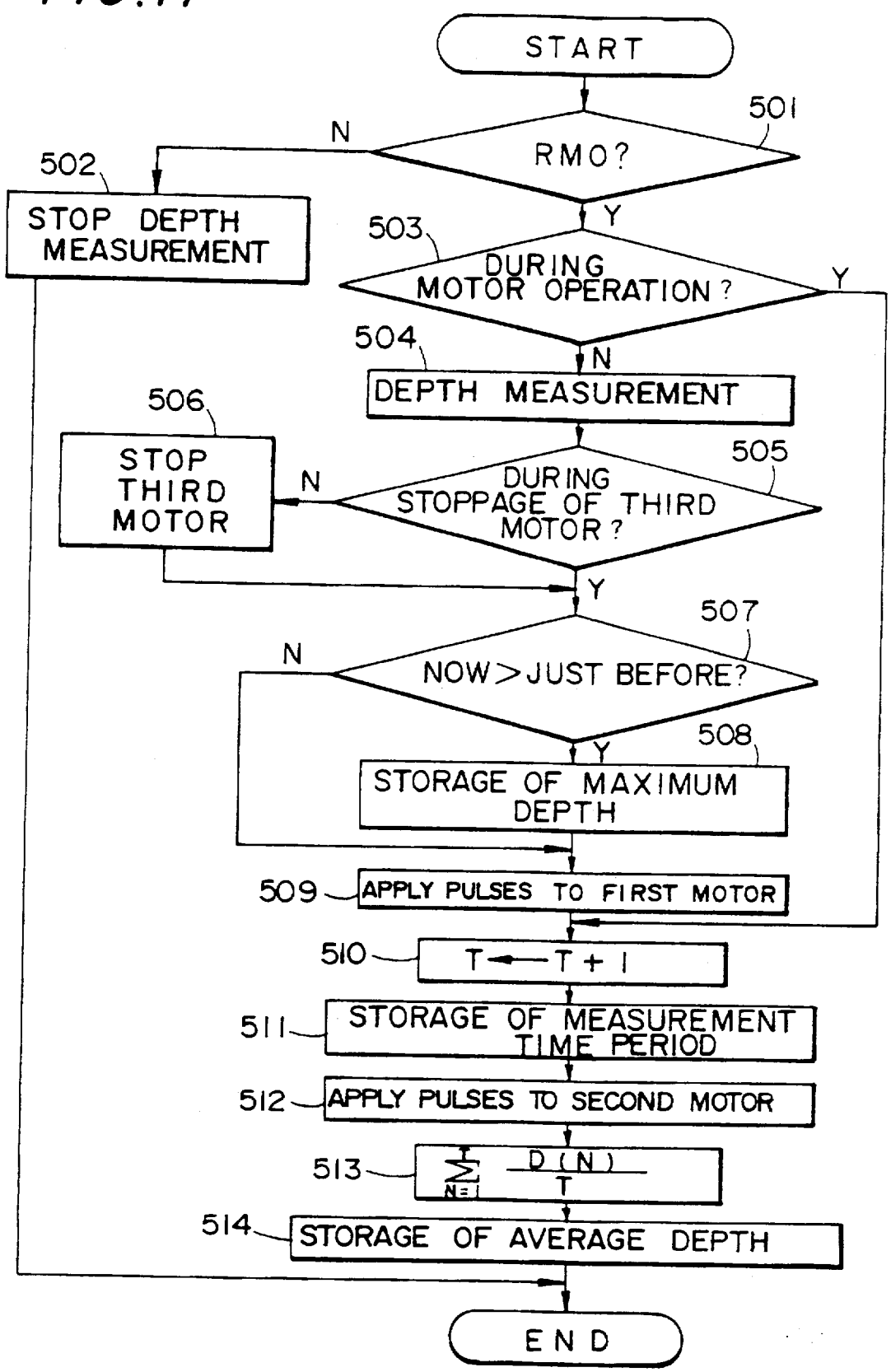
FIG. 17 is a flowchart for operation of the analog display measuring instrument shown in FIG. 13.

FIG. 17 is a flowchart illustrating the operation of the pointers in FIG. 13. After one Hz interruption from timer 913, it is determined whether or not the crown is zero-stage (RMO) (step 501). If not so, the measurement of depth is suspended (step 502). The program terminates. If the crown is zero-stage, motor operation/discrimination control 109 determines whether or not the first to third motors are in operation (step 503). If the motors are in operation, the measurement of depth is not carried out. The program jumps to step 510. If the motors are not in operation, the measurement of depth is then carried out by sensor 101 (step 504) while it is determined whether or not the third motor is stopped (step 505). If the third motor is stopped, the program directly proceeds to the next step. If the third motor is not stopped, the third motor is then stopped (step 506) and the program proceeds to the next step. At step 507, the currently measured depth is compared with the previous measured depth. If the current depth is not larger than the previous depth, then pulses are applied to the first motor (step 509), if the depth is greater than the previous stored maximum depth, the current depth is stored in the maximum depth memory 112 as a maximum depth (step 508).

At step 510, the time required to measure the depth is counted, the counted time being then stored in time information memory 113 (step 511). Pulses are then applied to the second motor 114 (step 512). At step 513, an average depth is computed from the measured depth and time by computer 104. The average depth is then stored in the computation result memory 113 (step 514). The program terminates.

Figure 14:
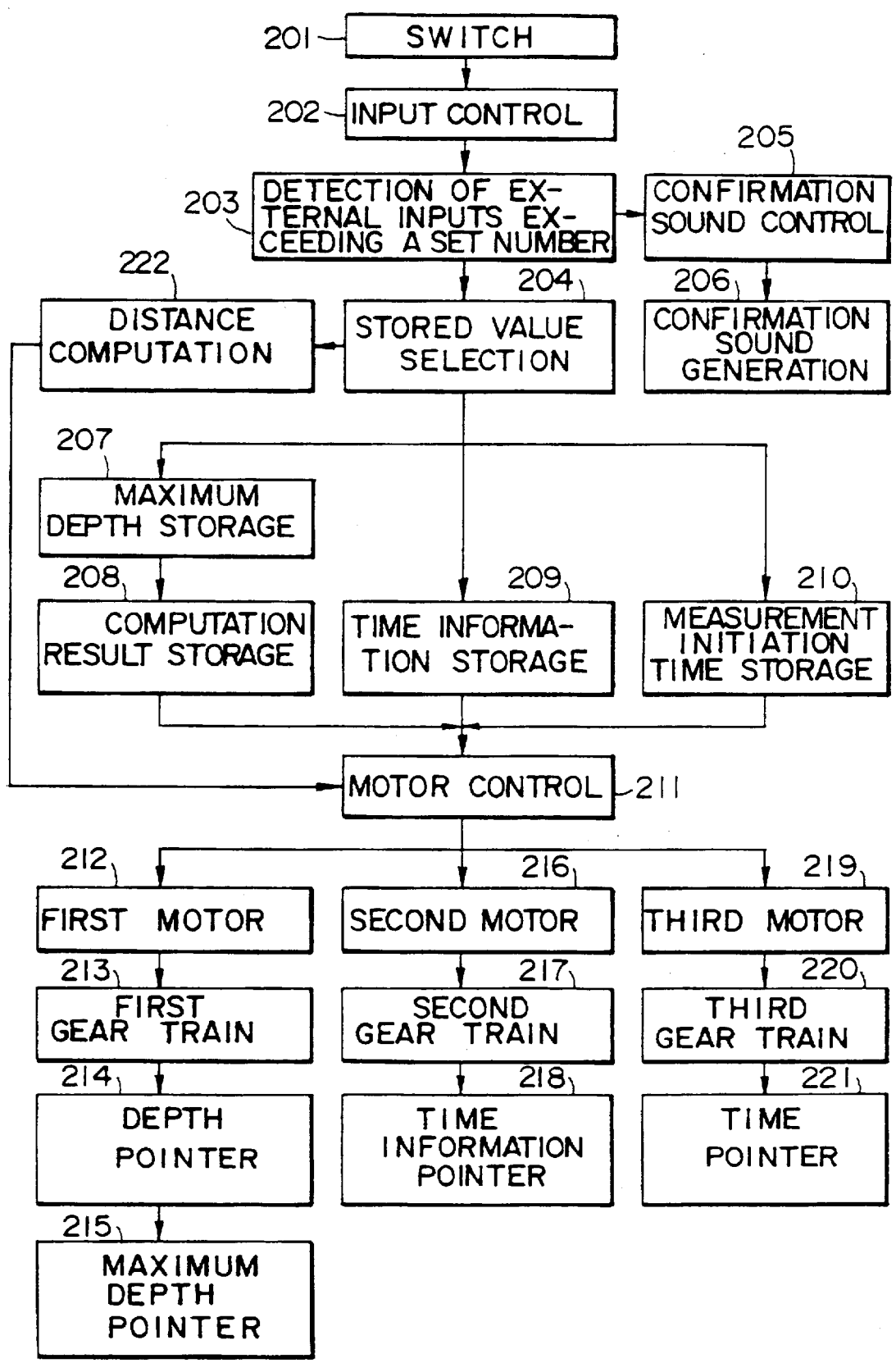
FIG. 14 is a block diagram of another embodiment of an analog display measuring instrument constructed in accordance with the present invention with a memory, having the functions of a memory recall and a memory recall confirmation sound.

FIG. 14 is a block diagram of another embodiment of an analog display measuring instrument according to the present invention, including a memory, a memory recall and a confirmation sound generator for generating a confirmation sound on memory recall.

A switch 201 is connected to external-inputs-exceeding preset-number detector 203 through input control 202. Detector 203 provides an output to a confirmation sound generator 206 through a confirmation sound control 205. Detector 203 also provides an output to a stored selector 204 which in turn provides outputs to a distance computer 222, a maximum depth storage 207, a time information storage 209 and a measurement initial time storage (memory) 210. A motor control 211 receives inputs from distance computer 222, maximum depth memory 207 through a computation result storage (memory) 208, time information memory 209 and measurement initiation memory 210. Motor control 211 then provides outputs to a first motor 212, a second motor 216 and a third motor 219. First motor 212 drives maximum depth pointer 215, second motor 216 drives a time information pointer 218 and third motor 219 drives time pointer 221.

The detector 203 counts the number of inputs from the switch 201 and causes confirmation sound generator 206 to generate a confirmation sound corresponding to the counted value through confirmation sound control 205. At the same time, stored value selector 204 selects a stored value corresponding to the counted value and selectively calls stored values from maximum depth memory 207, computation result memory 208, time information memory 209 and measurement initiation time memory 210. The first to third motors are controlled by motor control 211. The first motor 212 causes a depth pointer 214 to indicate the measured depth through a first gear train 213 and also causes a maximum depth pointer 215 to indicate the maximum depth.

The second motor 216 causes a time information pointer 218 to indicate the diving time through a second gear train 217. The third motor 219 causes a time pointer 221 to indicate the measurement initiation time through a third gear train 220.

When the detector means 203 senses that the number of inputs from the switch 201 exceeds a preset number, distance computer 222 computes distances from the respective current positions of the measured depth and time information pointers 214,218 to 12 o'clock position and a distance from the current position of the time pointer 221 to the present time indicating position. Thus, the motor control means 211 actuates the first to third motors only by the computed distances of movement of the pointers.

If the system of FIG. 14 is accomplished by a CPU system, it becomes similar to that of CPU 901. Merely by changing the software, there can be accomplished an analog measuring instrument of the present invention, including a memory, a memory recall and a device for generating a confirmation sound on memory recalling.

Figure 18:
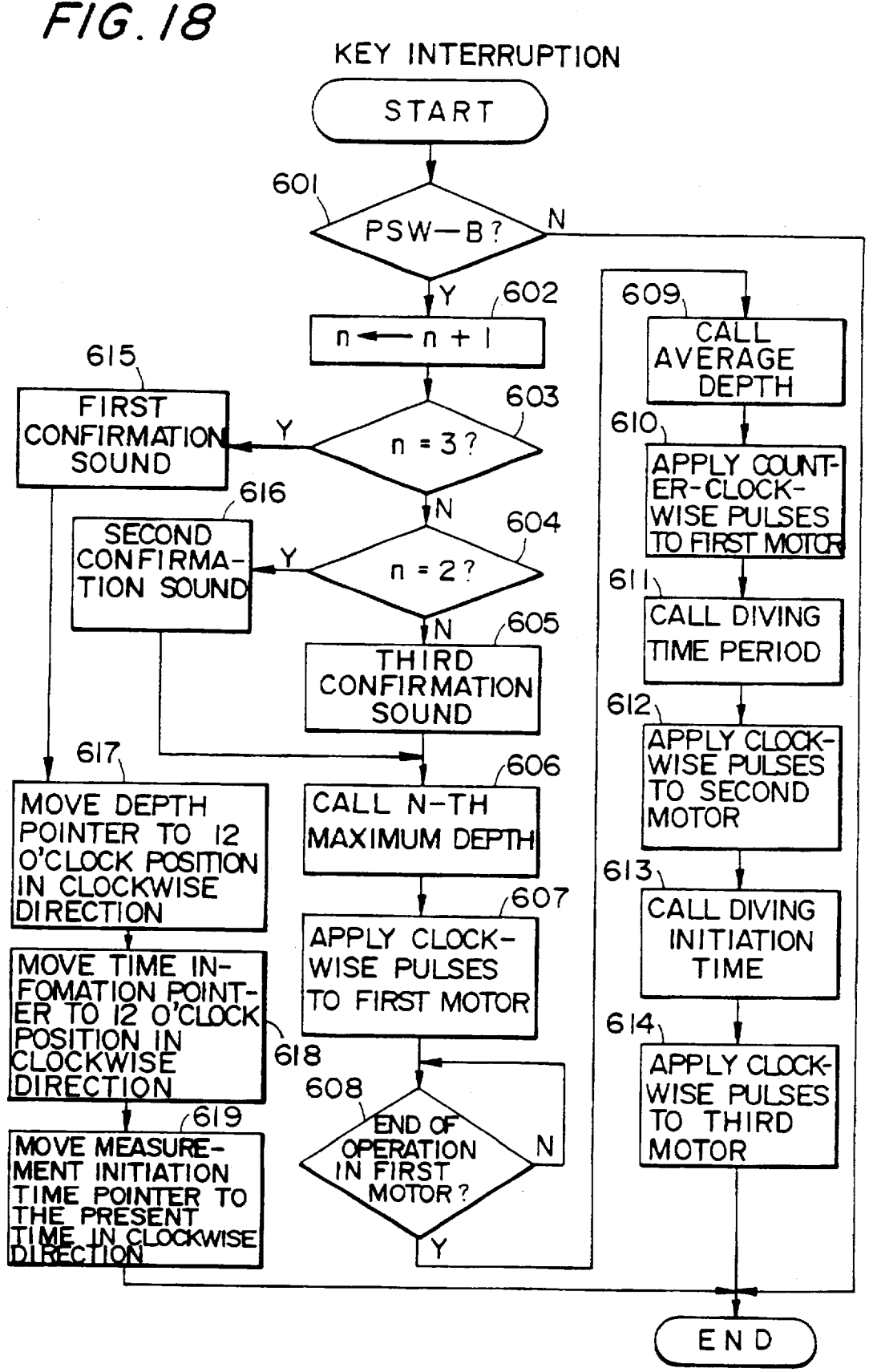
FIG. 18 is a flowchart for the operation of the analog display measuring instrument shown in FIG. 14.

Reference is now made to a flowchart shown in FIG. 18 wherein the operation of the analog measuring instrument of FIG. 14 is provided. After key interruption, it is determined whether or not the input is from PSW-B (step 601). If the input is not from PSW-B, the program terminates. If the input is from PSW-B, the number of inputs n is counted (step 602). If it is now assumed that the number of memories for diving information is equal to two, it is determined at step 603 whether or not n=3. If n=3 a first confirmation sound is generated by confirmation sound generator 206 (step 615). At the same time, the depth pointer is solely moved clockwise to 12 o'clock position in response to signals from motor control 211 (step 617); the time information pointer is solely moved clockwise to 12 o'clock position in response to signals from motor control 211 (step 618); and the time pointer is solely moved clockwise to the present time indicating position in response to signals from motor control 211 (step 619). The program then terminates. If n≠3, it is then determined whether or not n=2 (step 604). If n=2, a second confirmation sound is generated (step 616). If n≠2, a third confirmation sound is generated (step 605). At step 606, the maximum depth is retrieved from the n-th memory to apply clockwise pulses to the first motor (step 607). After the first motor 212 has been actuated (step 608), an average depth is retrieved (step 609) to apply counter-clockwise pulses to the first motor (step 610). The diving time is then retrieved (step 611) to apply clockwise pulses to the second motor 216 (step 612). The diving initiation time is then retrieved (step 613) to apply clockwise pulses to the third motor 219 (step 614). The program then terminates.

Figure 15:
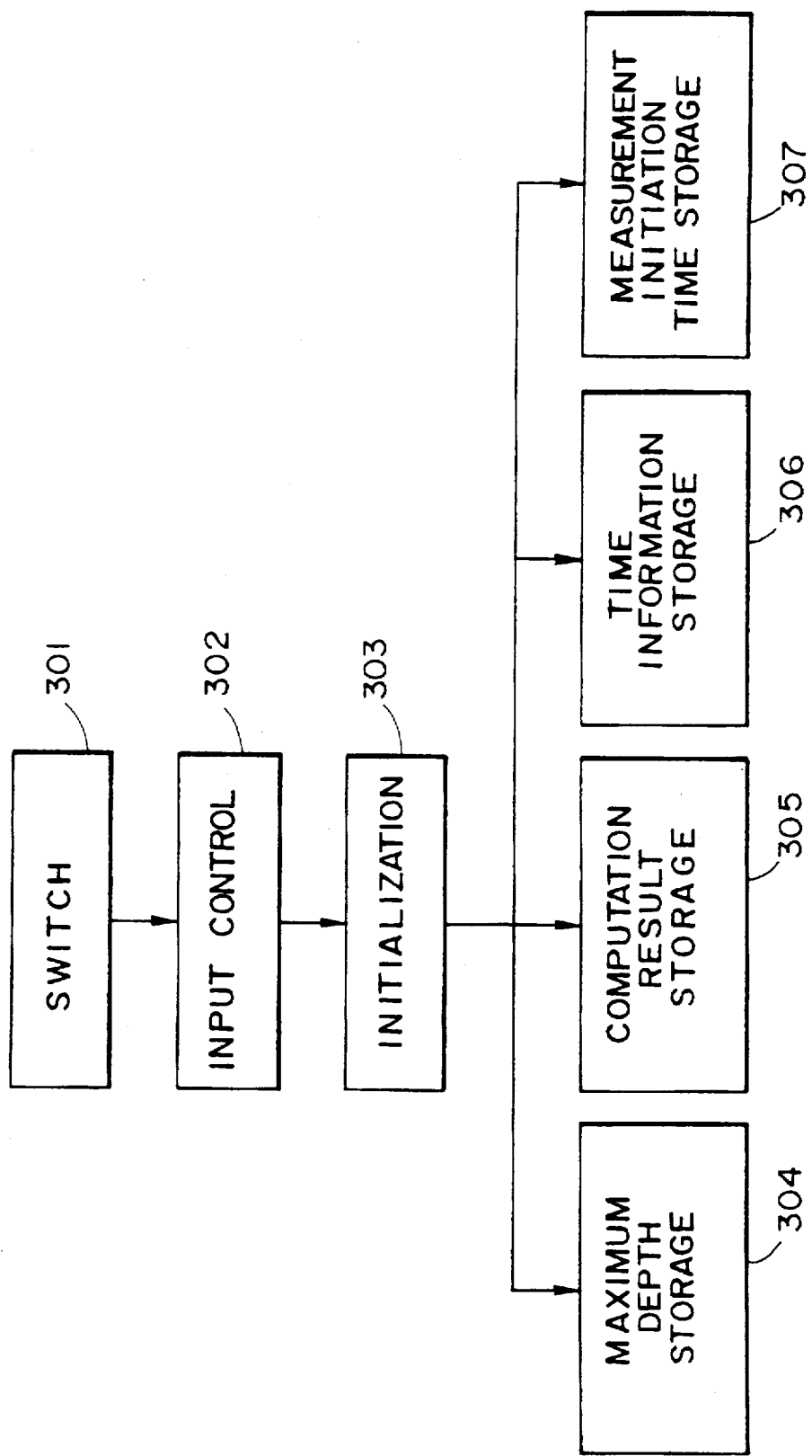
FIG. 15 is a block diagram of still another embodiment of an analog display measuring instrument constructed in accordance with the present invention, including a function of initializing the stored value.

FIG. 15 is a block diagram of another embodiment of an analog display measuring instrument according to the present invention, including means for initializing the stored value.

As a command from a switch 301 is received by initializing means 303 through input control means 302, the respective values stored in maximum depth storage (memory) 304, computation result storage memory 305, time information storage memory 306 and measurement initiation time storage (memory) 307 are erased. Any data is then stored in the respective storage (memory) 304, 305, 306 and 307.

If FIG. 15 is realized by a CPU system, it becomes similar to the system of CPU 901. Merely by changing the software, there can be realized an analog measuring instrument of the present invention including means for initializing the stored value.

Figure 19:
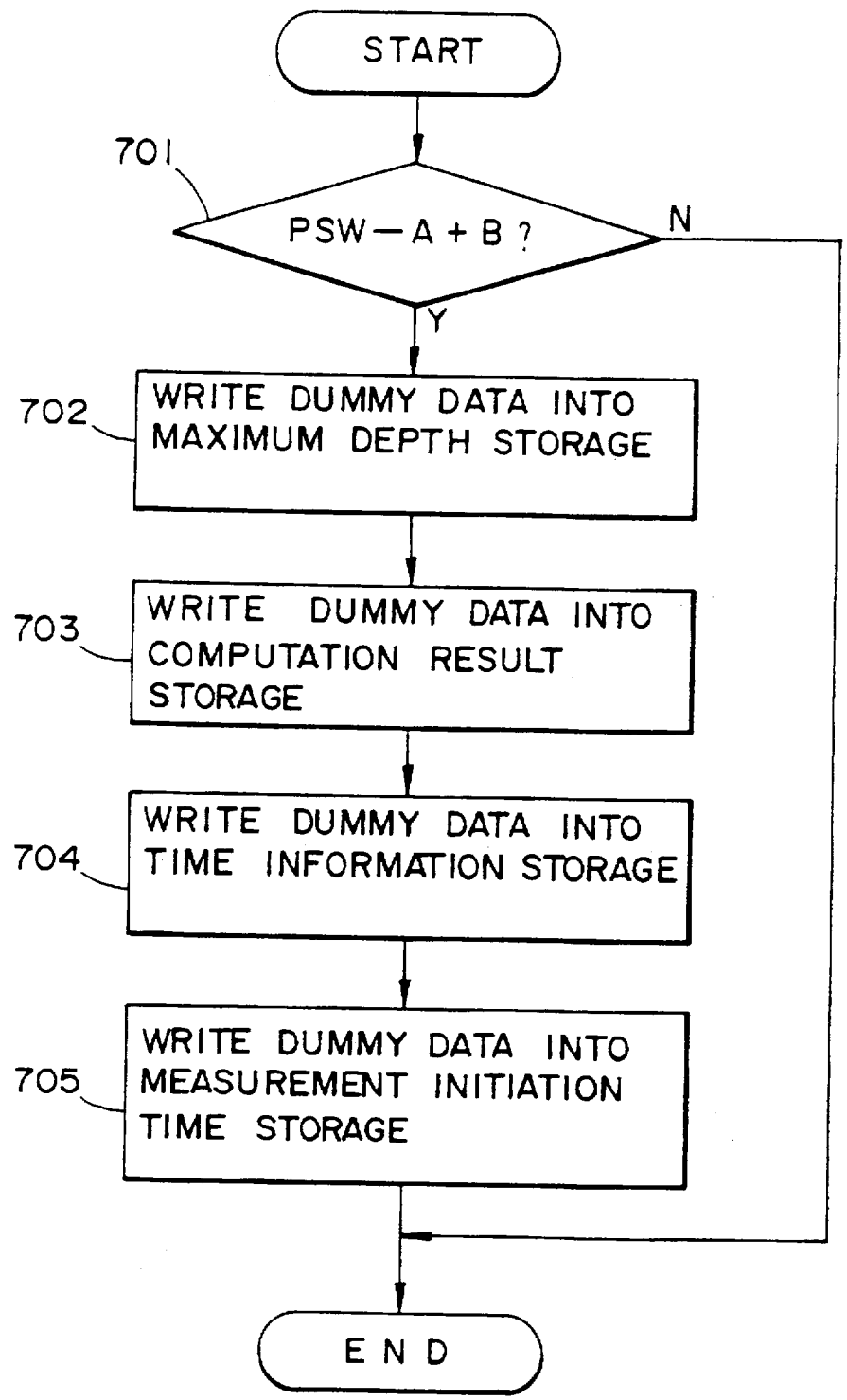
FIG. 19 is a flowchart for the operation of the analog display measuring instrument shown in FIG. 15.

Reference is now made to the flowchart of FIG. 19 wherein the operation of the analog display measuring instrument of FIG. 15 is provided. After a one Hz interruption, it is determined whether or not the inputs are from PSW-A+B, i.e. whether or not the inputs are simultaneously from the push switches A and B (step 701). If the inputs are not from PSW-A+B, the program terminates. If the inputs are from PSW-A+B, any value (dummy data) is written into the maximum depth memory 304 (step 702); any value (dummy data) is written into the computation result memory 305 (step 703); any value (dummy data) is written into the time information memory 306 (step 704); and any value (dummy data) is written into the measurement initiation time memory 307 (step 705). The program terminates.

Figure 16:
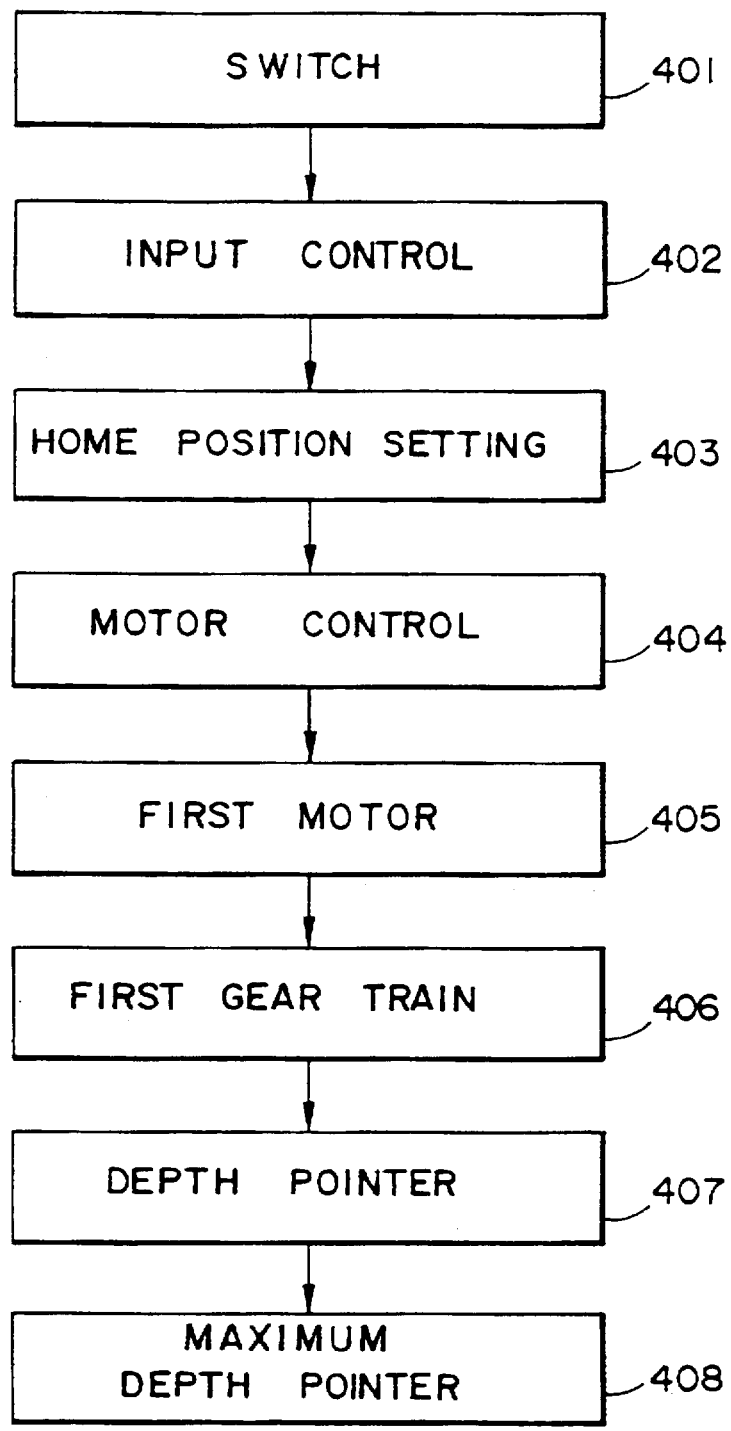
FIG. 16 is a block diagram of still another embodiment of an analog display measuring instrument constructed in accordance with the present invention, including the function of returning the maximum and measured value pointers to the home position.

FIG. 16 is a block diagram of another embodiment of an analog display measuring instrument according to the present invention, including structure for setting the home position of the maximum and current depth pointers.

A switch 401 is connected to home position setting means 403 through input control means 402. Motor control means 404 is actuated by a command from the home position setting means 403 to control a first motor 405. A depth pointer 407 and a maximum depth pointer 408 are driven by the first motor 405 through a gear train 406 to be returned to the home position of the depth pointer 407 and the maximum depth pointer 408.

If FIG. 16 is realized by a CPU system, it becomes similar to that of CPU 901. Merely by changing the software, there can be accomplished an analog display measuring instrument of the present invention including means for setting the home position of the maximum and current depth pointers.

Figure 20:
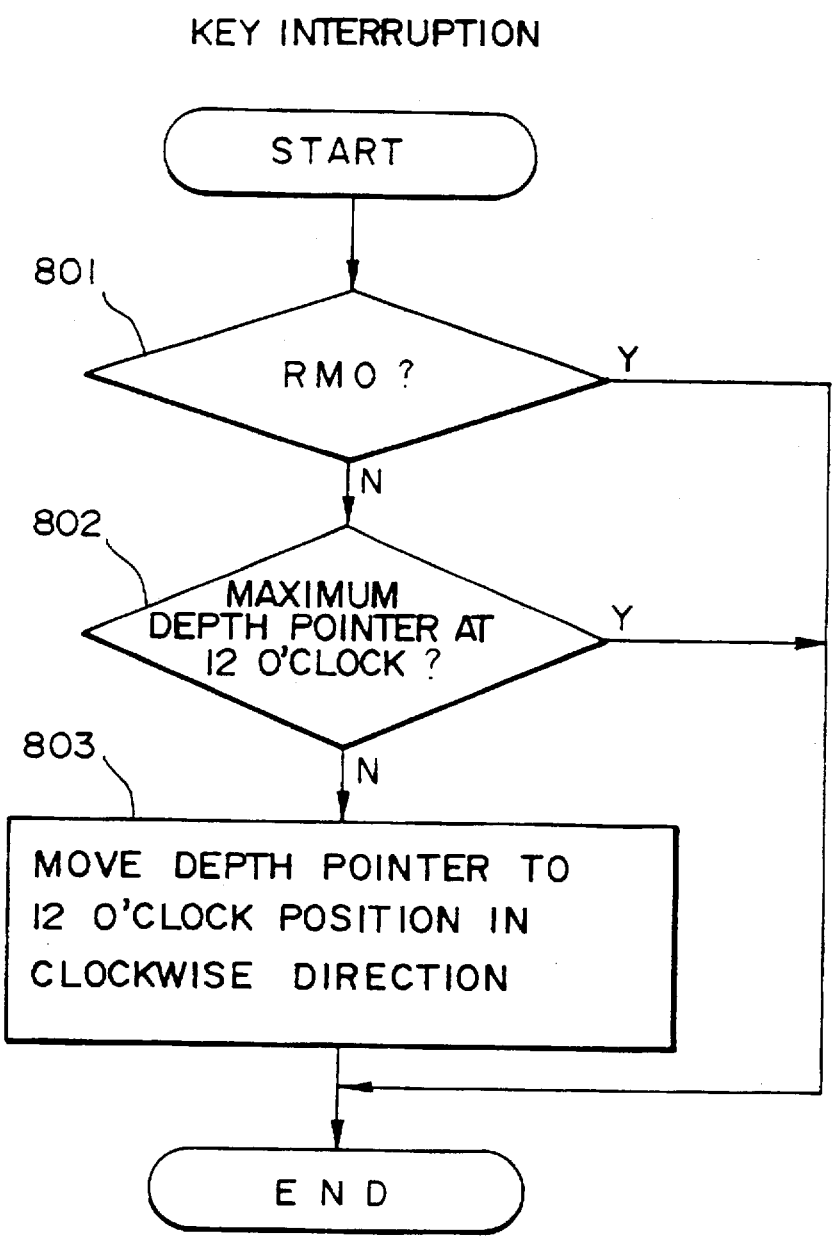
FIG. 20 is a flowchart for the operation of the analog display measuring instrument shown in FIG. 16.

Reference is now made to a flowchart of FIG. 20 showing operation of the analog display measuring instrument of FIG. 16. After key interruption, it is determined whether or not a crown AM is zero-stage (RMO) (step 801). If it is zero-stage, the program terminates. If the crown AM is not zero-stage, it is then determined whether or not the maximum depth pointer is in 12 o'clock position (step 802). If it is in 12 o'clock position, the program terminates. If the maximum depth pointer is not in 12 o'clock position, the depth pointer is solely moved clockwise to 12 o'clock position (step 803). The program then terminates.

The present invention is not limited to the aforementioned embodiments, but various modifications can be made within the scope of the invention.

For example, the pointer unit of this invention may be similarly used in any one of barometer, thermometer, altimeter and other meters in addition to the depth meter as described. Maximum value indications were only used by way of example. The present invention may be similarly applied to a form of indicating the current and minimum values other than the maximum value. The motor functioning as a drive source may be replaced by another drive source such as flat spiral spring or the like.

The cam bias is not limited to the leaf spring, but may be replaced by any other suitable bias means such as helical spring or the like.

The projections 62 may be formed in the control cam, rather than in the maximum value indicating wheel.

Although the mesh portion of the keep plate has been described to have 60 teeth thinned out for every one pitch, the teeth in the mesh portion may be thinned out for every two pitches with similar advantages.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An analog display measuring instrument comprising:
   a sensor for measuring a value of a sensed characteristic;
   a measured value pointer for indicating a current value measured by said sensor;
   a maximum or minimum value pointer indicating one of a maximum or minimum measured value respectively;
   a common drive source
   a gear train driven by said common drive source to move said measured value pointer and to move said maximum or minimum value pointer only in one of an incremental or decremental direction respectively; the gear train including a disengageable linkage member which couples movement of the measured value pointer to movement of the maximum or minimum value pointer as the measured value pointer is being increased from the value of the maximum value pointer or decreased from the value of the minimum value pointer and decouples movement of the measured value pointer and the maximum value pointer when the measured value pointer is being increased below the value of the maximum value pointer or is being decreased above the value of the minimum value pointer; and
   a control for controlling said drive source to move said measured value pointer to a position corresponding to a measured value obtained by said sensor.

2. A pointer unit in an analog display measuring instrument having a sensor for measuring a value of a sensed characteristic, the pointer unit comprising: a measured value pointer for indicating a current measured value, a maximum value pointer to be placed at the maximum measurement position for indicating the maximum measured value, a common drive source for driving said measured value pointer and maximum value pointer; and a gear train driven by said common drive source to move said measured value pointer and to move said maximum value pointer only in an incremental direction, the gear train including a disengageable linkage member which couples movement of the measured value pointer to movement of the maximum value pointer as the measured value pointer is being increased from the value of the maximum value pointer and decouples movement of the measured value pointer and the maximum value pointer when the measured value pointer is being increased at a value below that of the maximum value pointer.

3. The pointer unit in the analog display measuring instrument as defined in claim 2, wherein said gear train comprises:
   a measured value indicating wheel operatively coupled to said drive source and said measured value pointer for rotating said measured value pointer;
   a maximum value indicating wheel coupled to said maximum value pointer for rotating said maximum value pointer;
   a control cam operatively coupled to said maximum value indicating wheel and measured value indicating wheel for stopping said maximum value indicating wheel at the maximum measurement position; and a keep plate engageable with said control cam for stopping said control cam, wherein said measured value indicating wheel selectively drives and stops said control cam, said maximum value indicating wheel includes a cam engagement which engages with said control cam in a rotational direction of said maximum value indicating wheel and enables said control cam to slide in a diametric direction of said maximum value indicating wheel, and a cam bias for biasing said control cam in said diametric direction, and said control cam including a mesh portion engageable with said keep plate to stop said maximum value indicating wheel.

4. The pointer unit in an analog display measuring instrument of claim 3, wherein said keep plate includes a mesh portion formed therein at a position opposite to said mesh portion of said control cam and engageable with the mesh portion of said control cam.

5. The pointer unit in the analog display measuring instrument as defined in claim 3:

wherein an annular rotation slit having non-connected ends is formed in said measured value indicating wheel, said slit selectively driving and stopping said control cam and a groove portion formed in said slit at at least one end thereof for releasing said control cam from stoppage; and a rotary guide pin formed on said control cam which is received by said rotation slit to engage with said measured value indicating wheel in a given direction, engagements formed on said cam which rotatably engage with said cam engagement of said maximum value indicating wheel and slide in the diametric direction of said maximum value indicating wheel and a contact portion formed on said cam which is brought into contact with said cam bias means to receive biasing force; and said mesh portion of said control cam being formed on the outer periphery of said control cam at a position opposite to said contact portion.

6. The pointer unit in the analog display measuring instrument as defined in claim 5, wherein said groove portion formed in said rotation slit for releasing said control cam from stoppage has a sloped bias portion for biasing said rotary guide pin of said control cam and toward said rotation slit.

7. The pointer unit in the analog display measuring instrument as defined in claim 3, wherein said maximum value indicating wheel and control cam are in facing relationship, each having a respective facing surface, and a plurality of projections is formed on at least one of said facing surface of said maximum value indicating wheel and control cam for preventing close contact of said maximum or minimum value indicating wheel with said control cam.

8. The pointer unit in the analog display measuring instrument as defined in claim 3, wherein said mesh portion of the keep plate includes a plurality of teeth formed therein and each tooth being equidistantly spaced and each tooth having an inwardly facing side and an outwardly facing side from another tooth and said mesh portion of the control cam also including teeth each of engaging with any adjacent two teeth in the mesh portion of the keep plate at either said inwardly facing side or outwardly facing side.

9. The pointer unit in the analog display measuring instrument as defined in claim 5, wherein said groove portion formed in said rotation slit of said measured value indicating wheel for releasing said control cam from stoppage includes a jam preventing member for preventing a jam produced when said control cam engages with the keep plate.

10. A pointer unit in an analog display measuring instrument having a sensor for measuring a value of a sensed characteristic, the pointer unit comprising: a measured value pointer for indicating a current measured value, a minimum value pointer to be placed at the minimum measurement position for indicating the minimum value, a common drive source to drive said measured value pointer and said minimum value pointer; and a gear train driven by said common drive source to move said measured value pointer and to move said minimum value pointer only in a decremental direction, the gear train including a disengageable linkage member which couples movement of the measured value pointer to movement of the minimum value pointer as the measured value pointer is being decreased from the value of the minimum value pointer and decouples movement of the measured value pointer and the minimum value pointer when the measured value pointer is being decreased at a value above that of the minimum value pointer.

11. The pointer unit in the analog display measuring instrument as defined in claim 10, wherein said gear train comprises:

a measured value indicating wheel operatively coupled to said drive source and said measured value pointer for rotating said measured value pointer;

a minimum value indicating wheel coupled to said minimum value pointer for rotating said minimum value pointer;

a control cam operatively coupled to said minimum value indicating wheel and measured value indicating wheel for stopping said minimum value indicating wheel at the minimum measurement position according to rotation of said measured value indicating wheel; and a keep plate engageable with said control cam for stopping said control cam, wherein said measured value indicating wheel selectively drives and stops said control cam, said minimum value indicating wheel includes a cam engagement which engages with said control cam in a rotational direction of said minimum value indicating wheel and enables said control cam to slide in a diametric direction of said minimum value indicating wheel, and a cam bias for biasing said control cam in said diametric direction, and said control cam including a mesh portion engageable with said keep plate to stop said minimum value indicating wheel.

12. The pointer unit in the analog display measuring instrument as defined in claim 11:

wherein an annular rotation slit having non-connected ends is formed in said measured value indicating wheel, said slit selectively driving and stopping said control cam and a groove portion formed in said slit at at least one end thereof for releasing said control cam from stoppage; and a rotary guide pin formed on said control cam which is received by said rotation slit to engage with said measured value indicating wheel in a given direction, engagements formed on said cam which rotatably engage with said cam engagement of said minimum value indicating wheel and slide in the diametric direction of said minimum value indicating wheel and a contact portion formed on said cam which is brought into contact with said cam bias means to receive biasing force; and said mesh portion of said control cam being formed on the outer periphery of said control cam at a position opposite to said contact portion.

13. The pointer unit in the analog display measuring instrument as defined in claim 11, wherein said minimum value indicating wheel and control cam are-in facing relationship, each having a respective facing surface, and a plurality of projections is formed on at least one of said facing surface of said minimum value indicating wheel and control cam for preventing close contact of said maximum or minimum value indicating wheel with said control cam.

14. The analog display measuring instrument as defined in claim 1, wherein said analog display measuring instrument is capable of being in either a first or second indication mode further comprising:
   an input for selecting between said first or second indication mode;
   a maximum or minimum value memory operatively coupled to said sensor for storing the maximum or minimum value among values measured by said sensor;
   a computer operatively coupled to said sensor for performing a specific computation relative to a value measured by said sensor; and
   a computation result memory operatively coupled to said computer for storing a computed result, said control controlling said drive source to move said measured value pointer to a position corresponding to a value measured by said sensor when the first indication mode is selected by said input, or to a position corresponding to the maximum or minimum value stored in said maximum or minimum value memory and then to a position corresponding to a computed result stored in said computation result memory when the second indication mode is selected by said input means, whereby values respectively stored in said maximum or minimum value storage means and computation result storage means can be simultaneously indicated.

15. The analog display measuring instrument as defined in claim 14, further comprising an initializer for writing specific values into said maximum or minimum value memory and said computation result storage memory.

16. The analog display measuring instrument as defined in claim 14, wherein said computer computes an average value of measurements.

17. The analog display measuring instrument as defined in claim 1, further comprising:
   a timer for measuring an elapsed time;
   a time information pointer operatively coupled to said timer for indicating time information generated by said timer;
   a second gear train operatively coupled to said time information pointer for driving said time period information pointer; and
   a second drive source operatively coupled to said second gear train for driving said second gear train;
   wherein said control is operatively coupled to said timer and controls said second drive source to move said time information pointer to a position corresponding to a time measured by said timer, whereby a value measured by said sensor can be simultaneously indicated with time information from said timer.

18. The analog display measuring instrument as defined in, claim 14, further comprising:
   a timer for measuring an elapsed time;
   a time information pointer operatively coupled to said timer for indicating time information obtained by said timer;
   a second gear train operatively coupled to said time information pointer for driving said time information pointer;
   a second drive source operatively coupled to said second gear train for driving said second gear train; and
   a time information memory operatively coupled to said timer for storing time information generated by said timer;
   wherein said control is operatively coupled to said time information memory and controls said second drive source to move said time information pointer to a position corresponding to a value stored in said time information memory when the second indication mode is selected by said input means, whereby the value stored in said maximum or minimum value memory, a value stored in said computation result memory, and time information stored in said time information memory can be simultaneously indicated.

19. The analog display measuring instrument as defined in claim 18, further comprising an initializer for writing specific values into said time information storage means.

20. The analog display measuring instrument as defined in claim 1, further comprising:
   a time for measuring a present time;
   a time pointer operatively coupled to said timer, for indicating a present time measured by said timer;
   a third gear train operatively coupled said time pointer for driving said time pointer; and
   a third drive source operatively coupled said third gear train for driving said third gear train; and
   wherein said control controls said third drive source such that a present time measured by said timer is indicated by said time pointer when said sensor is not in operation, and a time at which said sensor has started measuring is indicated when said sensor is in operation.

21. The analog display measuring instrument as defined in claim 14, further comprising:
   a timer for measuring a present time;
   a time pointer, operatively coupled to said timer, for indicating a present time measured by said timer;
   a third gear train, operatively coupled to said time pointer, for driving said time pointer;
   a third drive source, operatively coupled to said third gear train, for driving said third gear train; and
   a measurement initiation time memory for storing a time of measurement initiation of said sensor;
   wherein said control controls said third drive source to move said time pointer to a position corresponding to a time stored in said measurement initiation time memory when the second indication mode is selected by said input, whereby the maximum or minimum value stored in said maximum or minimum value memory, a value stored in said computation result memory, and a time stored in said measurement initiation time memory can be simultaneously indicated.

22. The analog display measuring instrument as defined in claim 21, further comprising an initializer for writing specific values into said measurement initiation time memory.

23. The analog display measuring instrument as defined in claim 1, further comprising a home position setter for returning said measured value pointer and said minimum value pointer to a home position, wherein said control controls said home position setter to operate said drive source to move said measured value pointer and minimum value pointer to said home position.

24. The analog display measuring instrument as defined in claim 1, further comprising a home position setter for returning said measured value pointer and said maximum value pointer to a home position, wherein said control controls said home position setter to operate said drive source to move said measured value pointer and maximum value pointer to said home position.

25. The analog display measuring instrument as defined in claim 14:

wherein said input selects one of various types of second indication modes to indicate data stored in said maximum value memory and said computation result memory; and wherein said maximum value memory or said computation result memory is selected by selecting one of the second indication modes by said input to move said measured value pointer to a position corresponding to a measured value stored in a selected memory of maximum value memory and computation result memory;

said analog display measuring instrument further comprising a confirmation sound generator for generating a confirmation sound when one of the second indication modes is selected by said input and a confirmation sound control for causing said confirmation sound generator to generate a type of sound corresponding to the second indication mode selected by said input.

26. The analog display measuring instrument as defined in claim 25:

wherein said input selects one of the second indication modes for said maximum value memory or computation result memory depending on the number of inputs;

wherein said control controls said drive source depending on the number of inputs from said input to move said measured value pointer to a position corresponding to a measured value stored in a selected memory; and wherein said control controls said drive source to move said measured value pointer to a position of the measured value when the number of inputs from said input exceeds a predetermined number.

27. The analog display measuring instrument as defined in claim 1, further comprising an operation discriminator and control for suspending an operation of said sensor until said measured value pointer shows a result of preceding measurement.

28. The analog display measuring instrument as defined in claim 1, further comprising a crown input interlocked with said crown and an input control for stopping an operation of said sensor when there is an input from said crown input.

29. The analog display measuring instrument as defined in claim 28, wherein said crown is a screw lock type.

30. The analog display measuring instrument as defined in claim 1, wherein said sensor measures any one of depth of a diver, atmospheric pressure, temperature and altitude.

31. The analog display measuring instrument as defined in claim 14:

wherein said input selects one of various types of second indication modes to indicate data stored in said minimum value memory and said computation result memory; and wherein said minimum value memory or said computation result memory is selected by selecting one of the second indication modes by said input to move said measured value pointer to a position corresponding to a measured value stored in a selected memory of minimum value memory and computation result memory;

said analog display measuring instrument further comprising a confirmation sound generator for generating a confirmation sound when one of the second indication modes is selected by said input and a confirmation sound control for causing said confirmation sound generator to generate a type of sound corresponding to the second indication mode selected by said input.

32. The analog display measuring instrument as defined in claim 31:

wherein said input selects one of the second indication modes for said minimum value memory or computation result memory depending on the number of inputs;

wherein said control controls said drive source depending on the number of inputs from said input to move said measured value pointer to a position corresponding to a measured value stored in a selected memory; and wherein said control controls said drive source to move said measured value pointer to a position of the measured value when the number of inputs from said input exceeds a predetermined number.

* * * * *